US008891853B2

(12) United States Patent
Shinkai

(10) Patent No.: US 8,891,853 B2
(45) Date of Patent: Nov. 18, 2014

(54) IMAGE PROCESSING DEVICE, THREE-DIMENSIONAL IMAGE PRINTING SYSTEM, AND IMAGE PROCESSING METHOD AND PROGRAM

(75) Inventor: Yasuhiro Shinkai, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 321 days.

(21) Appl. No.: 13/308,979

(22) Filed: Dec. 1, 2011

(65) Prior Publication Data

US 2012/0195463 A1 Aug. 2, 2012

(30) Foreign Application Priority Data

Feb. 1, 2011 (JP) ................. 2011-019494

(51) Int. Cl.
*G06K 9/00* (2006.01)
*G06T 5/00* (2006.01)
*G06T 7/00* (2006.01)

(52) U.S. Cl.
CPC .......... *G06T 5/005* (2013.01); *H04N 2213/005* (2013.01); *G06T 2207/30201* (2013.01); *G06T 7/004* (2013.01)
USPC .......................................... 382/154; 382/103

(58) Field of Classification Search
None
See application file for complete search history.

(56) References Cited

U.S. PATENT DOCUMENTS

| | | | | |
|---|---|---|---|---|
| 5,852,671 | A * | 12/1998 | Oshima | 382/154 |
| 6,125,197 | A * | 9/2000 | Mack et al. | 382/154 |
| 6,477,267 | B1 * | 11/2002 | Richards | 382/154 |
| 7,605,776 | B2 | 10/2009 | Satoh et al. | |
| 8,149,268 | B1 * | 4/2012 | Meyers et al. | 348/42 |
| 8,243,334 | B2 * | 8/2012 | Abeloe | 358/2.1 |
| 8,279,218 | B1 * | 10/2012 | Fan et al. | 345/419 |
| 8,488,840 | B2 * | 7/2013 | Fukumoto et al. | 382/103 |
| 2001/0045979 | A1 * | 11/2001 | Matsumoto et al. | 348/43 |
| 2001/0052935 | A1 * | 12/2001 | Yano | 348/207 |
| 2002/0171648 | A1 * | 11/2002 | Inoue et al. | 345/474 |
| 2004/0228505 | A1 * | 11/2004 | Sugimoto | 382/118 |
| 2005/0151743 | A1 * | 7/2005 | Sitrick | 345/473 |
| 2005/0285878 | A1 * | 12/2005 | Singh et al. | 345/633 |
| 2006/0119597 | A1 * | 6/2006 | Oshino | 345/418 |
| 2006/0133672 | A1 * | 6/2006 | Li | 382/190 |

(Continued)

FOREIGN PATENT DOCUMENTS

| | | |
|---|---|---|
| EP | 2042079 | 4/2009 |
| JP | 8-212323 | 8/1996 |

(Continued)

OTHER PUBLICATIONS

Notification of Reasons for Refusal issued Dec. 4, 2012 by the Japanese Patent Office in corresponding Japanese Patent Application No. 2011-019494 with English translation, 8 pages.

(Continued)

*Primary Examiner* — Stephen R Koziol
*Assistant Examiner* — Sean Conner
(74) *Attorney, Agent, or Firm* — Young & Thompson

(57) ABSTRACT

The image processing device includes a three-dimensional image data input unit which enters three-dimensional image data representing a three-dimensional image, a subject extractor which extracts a subject from the three-dimensional image data, a spatial vector calculator which calculates a spatial vector of the subject from a plurality of planar image data having different viewpoints contained in the three-dimensional image data, and a three-dimensional image data recorder which records the spatial vector and the three-dimensional image data in association with each other.

30 Claims, 15 Drawing Sheets

(56) References Cited

U.S. PATENT DOCUMENTS

| | | | |
|---|---|---|---|
| 2007/0127787 A1* | 6/2007 | Castleman et al. | 382/118 |
| 2007/0257902 A1* | 11/2007 | Satoh et al. | 345/419 |
| 2007/0285419 A1* | 12/2007 | Givon | 345/420 |
| 2008/0152191 A1* | 6/2008 | Fujimura et al. | 382/103 |
| 2008/0309662 A1* | 12/2008 | Hassner et al. | 345/419 |
| 2009/0303507 A1* | 12/2009 | Abeloe | 358/1.9 |
| 2010/0039504 A1* | 2/2010 | Takahashi et al. | 348/54 |
| 2010/0110068 A1* | 5/2010 | Yamauchi et al. | 345/419 |
| 2010/0195869 A1* | 8/2010 | Geiss | 382/103 |
| 2010/0245382 A1* | 9/2010 | Sio | 345/593 |
| 2010/0259597 A1* | 10/2010 | Choi et al. | 348/46 |
| 2011/0001802 A1 | 1/2011 | Misawa | |
| 2011/0080336 A1* | 4/2011 | Leyvand et al. | 345/156 |
| 2011/0148868 A1* | 6/2011 | Chang et al. | 345/419 |
| 2011/0193939 A1* | 8/2011 | Vassigh et al. | 348/46 |
| 2011/0211754 A1* | 9/2011 | Litvak et al. | 382/165 |
| 2011/0222744 A1* | 9/2011 | Kim et al. | 382/118 |
| 2011/0242134 A1* | 10/2011 | Miller et al. | 345/633 |
| 2011/0304640 A1* | 12/2011 | Noge | 345/589 |
| 2012/0183202 A1* | 7/2012 | Wei et al. | 382/154 |
| 2012/0257018 A1* | 10/2012 | Shigemura et al. | 348/46 |
| 2012/0274550 A1* | 11/2012 | Campbell et al. | 345/156 |
| 2012/0274634 A1* | 11/2012 | Yamada et al. | 345/419 |
| 2012/0319945 A1* | 12/2012 | McCarthy et al. | 345/156 |
| 2013/0136302 A1* | 5/2013 | Nam et al. | 382/103 |

FOREIGN PATENT DOCUMENTS

| | | |
|---|---|---|
| JP | 2000-90288 | 3/2000 |
| JP | 2001-346226 | 12/2001 |
| JP | 2003-85587 | 3/2003 |
| JP | 2004-334833 | 11/2004 |
| JP | 2004-334836 | 11/2004 |
| JP | 2006-165795 | 6/2006 |
| JP | 2006-202276 | 8/2006 |
| JP | 2008-090617 | 4/2008 |
| JP | 2008-216513 | 9/2008 |
| JP | 2008-252493 | 10/2008 |
| JP | 2010-045584 | 2/2010 |
| WO | 0207839 A2 | 1/2002 |
| WO | 0207839 A3 | 1/2002 |

OTHER PUBLICATIONS

Decision to Rejection issued Feb. 5, 2013 by the Japanese Patent Office in corresponding Japanese Patent Application No. 2011-019494 with English translation, 5 pages.

Extended European Search Report dated Jan. 30, 2013; Application No. 11196017.5.

* cited by examiner

IMAGE PROCESSING DEVICE, THREE-DIMENSIONAL IMAGE PRINTING SYSTEM, AND IMAGE PROCESSING METHOD AND PROGRAM

BACKGROUND OF THE INVENTION

The present invention relates to an image processing device, a three-dimensional image printing system, and an image processing method and program for producing a three-dimensional image corresponding to three-dimensional image data.

Conventionally, a sense of depth is produced using a parallax produced by displaying a combination of a plurality of images having different lines of sight. Examples of methods for producing a sense of depth include a method (1) applying linear polarization to the left eye image and the right eye image in directions intersecting each other at right angles and using polarized glasses, a method (2) whereby the left eye image and the right eye image are displayed alternately and viewed with glasses equipped with liquid crystal shutters synchronized with the display means, and a method (3) using red and blue light that are superposed on the left eye image and the right eye image, respectively, and glasses having red and blue color filters on the left and the right side thereof.

Another method of producing a sense of depth to the naked eye is one whereby, for example, an image is cut into a plurality of strips and arranged alternately for the left and the right eye to view their respective images using a parallax barrier or a lenticular lens to enable depth perception.

As related to the present invention may be cited prior art documents JP 2006-165795 A, JP 2008-90617 A, JP 2008-252493 A, and JP 2004-334833 A.

JP 2006-165795 A describes a three-dimensional image producing device wherein imaging is performed by a plurality of imaging devices from a plurality of positions, and upon designation of given positions from among the plurality of positions and imaging times, a plurality of frame images different in imaging time are selected, whereupon a three-dimensional image producer combines the selected frame images and prints a three-dimensional image such that the three-dimensional image can be sequentially observed through a given optical system as the viewpoint moves.

JP 2008-90617 A describes a three-dimensional image producing device comprising a detector for detecting the position, the posture or the shape of a real object placed on a three-dimensional display plane or close to the three-dimensional display plane, a blocked region calculator for calculating a blocked region that is a region where the light emitted from the three-dimensional display plane is blocked by the real object according to the position, the posture or the shape of the real object, and a drawer for performing an image processing on the blocked region that is different from the image processing performed on the other region than the blocked region to draw a three-dimensional image.

JP 2008-252493 A describes a file producing device comprising a luminance image acquiring means for acquiring a luminance image representing the luminances of points captured by an imaging system upon imaging an imaged space, a three-dimensional information acquiring means for acquiring three-dimensional information representing spatial positions of respective points with a given coordinate system, and an offset origin setting means for receiving inputs of offset values on the axes of the coordinate system entered from a given input unit to store the offset values in a given memory and set an offset origin that is a point obtained by displacing the origin of the coordinate system by the offset values. The file producing device produces a file in a given format having a region for storing information.

JP 2004-334833 A describes a stereoscopic image processing device containing as image control information a tag representing a three-dimensional intensity of a stereoscopic image (three-dimensional intensity tag) such that a stereoscopic image is displayed with a greater depth as the three-dimensional intensity level increases and thus capable of managing the designation of a display device on which a stereoscopic image is to be shown as attached information.

SUMMARY OF THE INVENTION

There have been proposed a number of methods of displaying three-dimensional image data whereby the degree of perceived depth (amount of depth or pop-out amount) and the stereoscopic parallax are adjusted to reduce fatigue felt by the viewer of a three-dimensional image or to adjust the unnaturalness of a three-dimensional image. Conventionally, adjustments were made according to the degree to which a subject pops out from the screen or retracts therefrom but there have been disclosed or suggested no indicators representing the degree and the direction to which a subject pops out from the screen or retracts therefrom.

Further, printing a three-dimensional image required a dedicated device as well as time and effort, costing more than normal printing. Therefore, it is preferable that the user acquires a print as he/she desires of a three-dimensional image in his/her first attempt.

An object of the present invention is to provide an image processing device, a three-dimensional image printing system, and an image processing method and program for producing a three-dimensional image, wherein indicators representing the degree and the direction to which a subject pops out or retracts are expressed by a spatial vector and wherein the spatial vector is used in various image processing to produce a three-dimensional image that appears more natural and permits ready perception of depth.

In order to achieve the above object, the present invention provides an image processing device, comprising:

a three-dimensional image data input unit which enters three-dimensional image data representing a three-dimensional image;

a subject extraction unit which extracts a subject from the three-dimensional image data;

a spatial vector calculating unit which calculates a spatial vector of the subject from a plurality of planar image data having different viewpoints contained in the three-dimensional image data; and a three-dimensional image data recording unit which records the spatial vector and the three-dimensional image data in association with each other.

Preferably, the subject extraction unit further extracts a face of the subject, a face direction detecting unit which detects the subject's face direction is further provided, and the spatial vector calculating unit uses the face direction to calculate a face spatial vector.

Preferably, the subject extraction unit extracts a plurality of the subject's bodily portions, and the spatial vector calculating unit calculates spatial vectors of the plurality of the subject's bodily portions.

Preferably, the three-dimensional image data recording unit records a greatest spatial vector among spatial vectors of the plurality of the subject's bodily portions and the three-dimensional image data in association with each other.

Preferably, the three-dimensional image data recording unit records the subject's spatial vector in an Exif tag of the three-dimensional image data.

Preferably, the three-dimensional image data recording unit records the subject's spatial vector in a file other than a file of the three-dimensional image data.

Preferably, the spatial vector calculating unit calculates a parallax of the subject and the distances from the viewpoints to the subject from the plurality of planar image data having different viewpoints and calculates the spatial vector of the subject from the plurality of planar image data having different viewpoints, the parallax, and the distances.

Preferably, the image processing device further comprises:

a template recording unit having therein recorded a plurality of kinds of three-dimensional image template;

a template selecting unit which selects a given number of three-dimensional image templates according to the spatial vector recorded in association with the three-dimensional image data from among a plurality of kinds of three-dimensional image templates recorded in the template recording unit; and a synthesizing unit which combines the three-dimensional image data with one three-dimensional image template selected by a user from among a given number of three-dimensional image templates selected by the template selecting unit to produce and outputs synthesized three-dimensional image data representing a synthesized three-dimensional image.

Preferably, the template selecting unit selects a three-dimensional image template containing a character whose pop-out amount is greater than N/3 and smaller than 3N, N being the subject's pop-out amount.

Preferably, the template selecting unit further selects the three-dimensional image template according to the subject's face direction and the subject's position in the three-dimensional image.

Preferably, the template selecting unit performs selection such that when the subject faces leftward or rightward and is placed on a left side or on a right side in the three-dimensional image and the character contained in the three-dimensional image template is placed on the left side or on the right side, and when the subject's face direction is directed toward the character, three-dimensional image templates containing the character's up-and-down face directions opposite from the subject's face direction are not selected, whereas when the subject's face direction is not directed toward the character, three-dimensional image templates containing the character's left-and-right face directions opposite from the subject's face direction are not selected and three-dimensional image templates containing the character's up-and-down face directions opposite from the subject's face direction are not selected, while three-dimensional image templates containing a character directed toward other directions are selected.

Preferably, when the subject faces leftward or rightward and is placed on a center in the three-dimensional image and the character contained in the three-dimensional image template is placed on a left side or on a right side of the subject, the template selecting unit does not select three-dimensional image templates containing the character's up-and-down face directions opposite from the subject's face direction, and selects three-dimensional image templates containing a character directed toward other directions irrespective of the subject's face direction.

Preferably, when the subject's face direction is directed toward a center, the template selecting unit does not select three-dimensional image templates containing the character's up-and-down face directions opposite from the subject's face direction and selects three-dimensional image templates containing the character's other face directions irrespective of the subject's position and face direction.

Preferably, the template selecting unit sets an order of priority in the character's pop-out amount and face direction contained in the three-dimensional image template and selects the three-dimensional image template according to the order of priority.

Preferably, the template selecting unit displays the pop-out amount and the face direction of the character contained in the three-dimensional image template on a preview screen and selects one three-dimensional image template selected by the user from among a plurality of three-dimensional image templates displayed on the preview screen.

Also, the present invention provides a three-dimensional image printing system, comprising:

the image processing device described above; and a printing device for printing a synthesized three-dimensional image corresponding to synthesized three-dimensional image data outputted from the image processing device.

Also, the present invention provides an image processing method, comprising:

a three-dimensional image data input step of receiving three-dimensional image data representing a three-dimensional image entered from an outside;

a subject extraction step of extracting a subject from the three-dimensional image data;

a spatial vector calculating step of calculating a spatial vector of the subject from a plurality of planar image data having different viewpoints contained in the three-dimensional image data; and a three-dimensional image data recording step of recording the spatial vector and the three-dimensional image data in association with each other.

And also, the present invention provides a non-transitory computer readable medium embodied with a program for causing a computer to execute the steps of the image processing method described in above.

The present invention enables acquisition, without failure, of a three-dimensional image that appears more natural and allows ready perception of depth without causing a viewer to be conscious of the spatial vector, a synthesized image in which a user image and an image of a character are combined and which appears more natural and allows ready perception of depth, and a three-dimensional print (three-dimensional photograph) obtained by printing the above images.

DETAILED DESCRIPTION OF THE INVENTION

The following describes in detail the image processing device of the present invention for implementing the image processing method and the three-dimensional image printing system of the invention based upon the preferred embodiments illustrated in the accompanying drawings.

First, a spatial vector of a subject in a three-dimensional image according to the invention will be described.

Figure 1A:
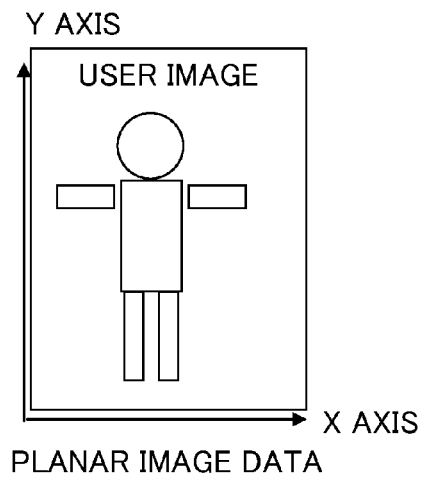
FIG. 1A is an explanatory view illustrating the axes of a planar image data.
Figure 1B:
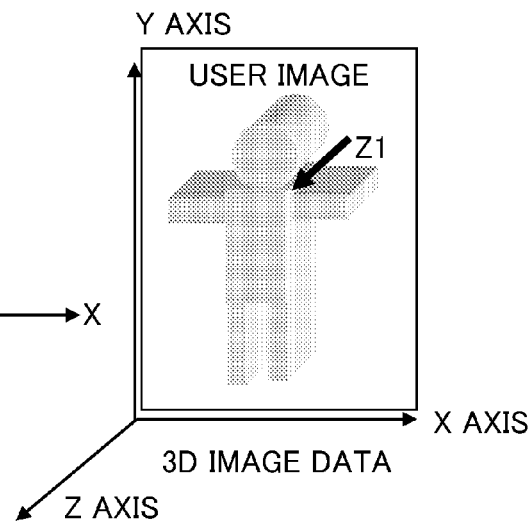
FIG. 1B is an explanatory view for illustrating an example of the axes and a spatial vector of three-dimensional image data of the invention.

FIGS. 1A and 1B compare planar image data and three-dimensional image data of a user image.

FIG. 1A illustrates the axes of planar image data representing a conventional planar image (two-dimensional data having two axes, X and Y axis), where the horizontal axis is X axis, and the vertical axis is Y axis. FIG. 1B illustrates an example of the axes and a spatial vector of three-dimensional image data (three-dimensional data having X, Y, and Z axis) representing a three-dimensional image according to the invention having a Z axis perpendicular to the X and the Y axis of the planar image data and to the plane formed by the X and the Y axis of the planar image data, where the Z axis indicates the direction in which a subject pops out (amount of depth or pop-out amount). Thus, the spatial vector represents three-dimensional data on the X, the Y, and the Z axis contained in the three-dimensional image data.

Examples of three-dimensional image data include image data of a stereo image containing a planar image for the left eye and a planar image for the right eye. In other words, image data of a stereo image contains image data of a planar image for the left eye and image data of a planar image for the right eye in one piece of image data. The three-dimensional image data are not limited to image data of a stereo image and need only contain image data of a plurality of planar images acquired from different viewpoints in one piece of three-dimensional image data.

To obtain a spatial vector of a subject in a three-dimensional image, using a method, which may be, for example, one described in JP 2006-165795, JP 2001-346226, or JP 2008-90617, first the parallax (amount of parallax) between a planar image for the left eye and a planar image for the right eye and the distance from the viewpoints to the subject are calculated from the results of detection of corresponding points obtained by template matching between planar images for the left eye and the right eye.

Next, (the image data of) a planar image for the left eye and a planar image for the right eye and the obtained parallax and distance are used to calculate the axis values of a spatial vector represented by the X, the Y, and the Z axis in order to obtain a spatial vector represented by (X, Y, Z). The Z-axis value (pop-out amount) is proportional to the parallax and the distance as described in, for example, JP 2010-45584 A; it increases as the parallax increases and increases as the distance increases. Therefore, with the distance obtained, the Z-axis value can be uniquely determined according to the parallax. For example, in FIG. 1B, suppose that the Z-axis value (pop-out amount in the Z-axis direction) is Z1, the spatial vector is expressed as (0, 0, Z1), where the initial point coordinates are (0, 0, 0) and the end point coordinates are (0, 0, Z1). The X-axis value and the Y-axis value are detected in a position where, for example, the Z-axis value stands out; the bodily portions of the subject such as, for example, hands, legs, and face corresponding to detected Z-axis values are determined, whereupon the X-axis value and the Y-axis value are calculated from the positional relationship between the subject's trunk and the determined bodily portions. When, for example, the subject's hand is detected as a bodily portion outstanding in the Z-axis value, the X-axis value and the Y-axis value are calculated from the position of the shoulder of the trunk and the position of the tip of the hand. The spatial vector may be calculated by any of various methods including known methods whereby a spatial vector is calculated from planar image data of a plurality of planar images acquired from different viewpoints contained in three-dimensional image data.

Next, the image processing device of the invention will be described.

Figure 2:
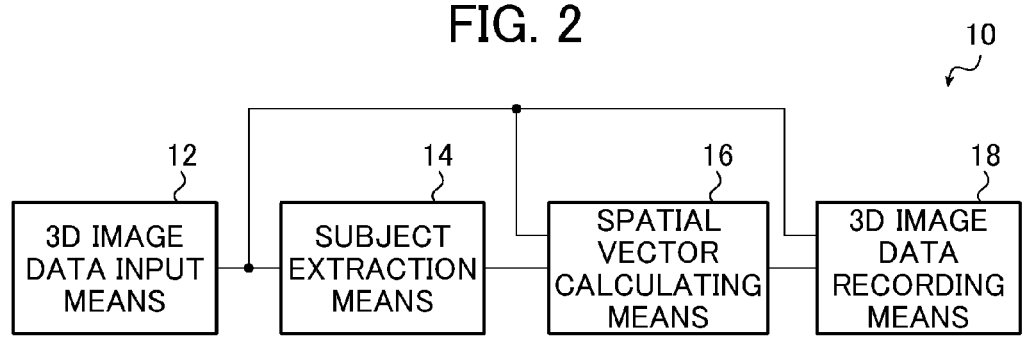
FIG. 2 is a block diagram illustrating a first embodiment of the image processing device according to the present invention.

FIG. 2 is a block diagram of a first embodiment illustrating a configuration of the image processing device of the invention for implementing the image processing method of the invention.

An image processing device illustrated in FIG. 2 comprises a three-dimensional image data input unit 12, a subject extraction unit 14, a spatial vector calculating unit 16, and a three-dimensional image data recording unit 18.

The three-dimensional image data input unit 12 is provided to enter three-dimensional image data and comprises an external interface for entering three-dimensional image data into the image processing device 10 from the outside. The method of producing three-dimensional image data is not specifically limited; various three-dimensional image data may be entered including moving image/still image data acquired by the user with a digital still camera or a digital video camera capable of acquiring a three-dimensional image and moving image/still image data downloaded from a network. The external interfaces include USB (Universal Serial Bus), memory card reader/writer, optical disc, and wired and wireless LAN (Local Area Network). Three-dimensional image data are entered from the outside via external interface. The three-dimensional image data input unit 12 receives three-dimensional image data entered from the outside and supplies the data to components of the image processing device 10.

The subject extraction unit 14 receives three-dimensional image data entered from the three-dimensional image data input unit 12. The subject extraction unit 14 analyzes the three-dimensional image data and extracts (the region of) a subject in a three-dimensional image. The extraction of a subject may be achieved by any of various methods including, for example, such known methods as edge detection and color detection. Further, regions of individual bodily portions of a subject such as the face, the left and the right hand, the flunk, and the legs are extracted. The subject extraction unit 14 produces information on the extracted subject and information on the subject's individual bodily portions and outputs the information as subject information.

The spatial vector calculating unit 16 receives three-dimensional image data from the three-dimensional image data input unit 12 and the subject information from the subject extraction unit 14. As described above, the spatial vector calculating unit 16 performs template matching of a subject between main image data and subsidiary image data contained in three-dimensional image data to detect corresponding points, and based on the results of detection of corresponding points, calculates the parallax and the distance for the subject or for each of the subject's bodily portions. From the calculated parallax and distance, the values of the spatial vector on the individual axes are calculated to obtain and output the spatial vector.

Figure 3:
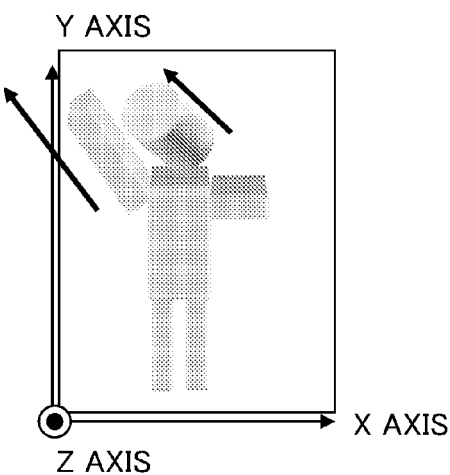
FIG. 3 is an explanatory view illustrating another example of the axes and a spatial vector of three-dimensional image data of the invention.

In the example illustrated in FIG. 3, the Z axis lies in the direction perpendicular to the drawing, and the spatial vectors indicate the subject's face and left and right hand directed upward to the right. Now, suppose that the spatial vector of the face has coordinates (X2, Y2, Z2), where the initial point coordinates are (0, 0, 0) and the end point coordinates (X2, Y2, Z2), which also applies to the description to follow, and the spatial vector of the right hand has coordinates (X3, Y3, Z3). When the face spatial vector and the right hand spatial vector are compared, the spatial vector calculating unit 16 may output, for example, the spatial vector of the right hand, which has the greater magnitude, as spatial vector to be recorded in association with the three-dimensional image data. The magnitude of, for example, the face spatial vector is obtained using a formula (1); the right hand spatial vector is obtained using a formula (2). The spatial vectors that are outputted are not limited to the above; one or more of the spatial vectors of the face, the left hand, the trunk, and the legs may be outputted.

$$\sqrt{(X2^2+Y2^2+Z2^2)} \qquad (1)$$

$$\sqrt{(X3^2+Y3^2+Z3^2)} \qquad (2)$$

The three-dimensional image data recording unit 18 receives three-dimensional image data from the three-dimensional image data input unit 12 and a spatial vector from the spatial vector calculating unit 16. The three-dimensional image data recording unit 18 records the spatial vector and three-dimensional image data associated with each other. The three-dimensional image data recording unit 18 may be a semiconductor memory such as a DRAM (Dynamic Random Access Memory) and a flash memory or a magnetic recording medium such as an HDD (Hard Disk Drive).

The spatial vector may be recorded in various manners: its value may be written in a part of the Exif (Exchangeable image file format) tag of the three-dimensional image data or it may be recorded as a file (e.g., file name: Image0001.vct) separate from the three-dimensional image data file (e.g., file name: Image0001.jpg).

Next, the operation of the first embodiment of the image processing device 10 of the invention implementing the image processing method of the invention will be described.

Figure 4:
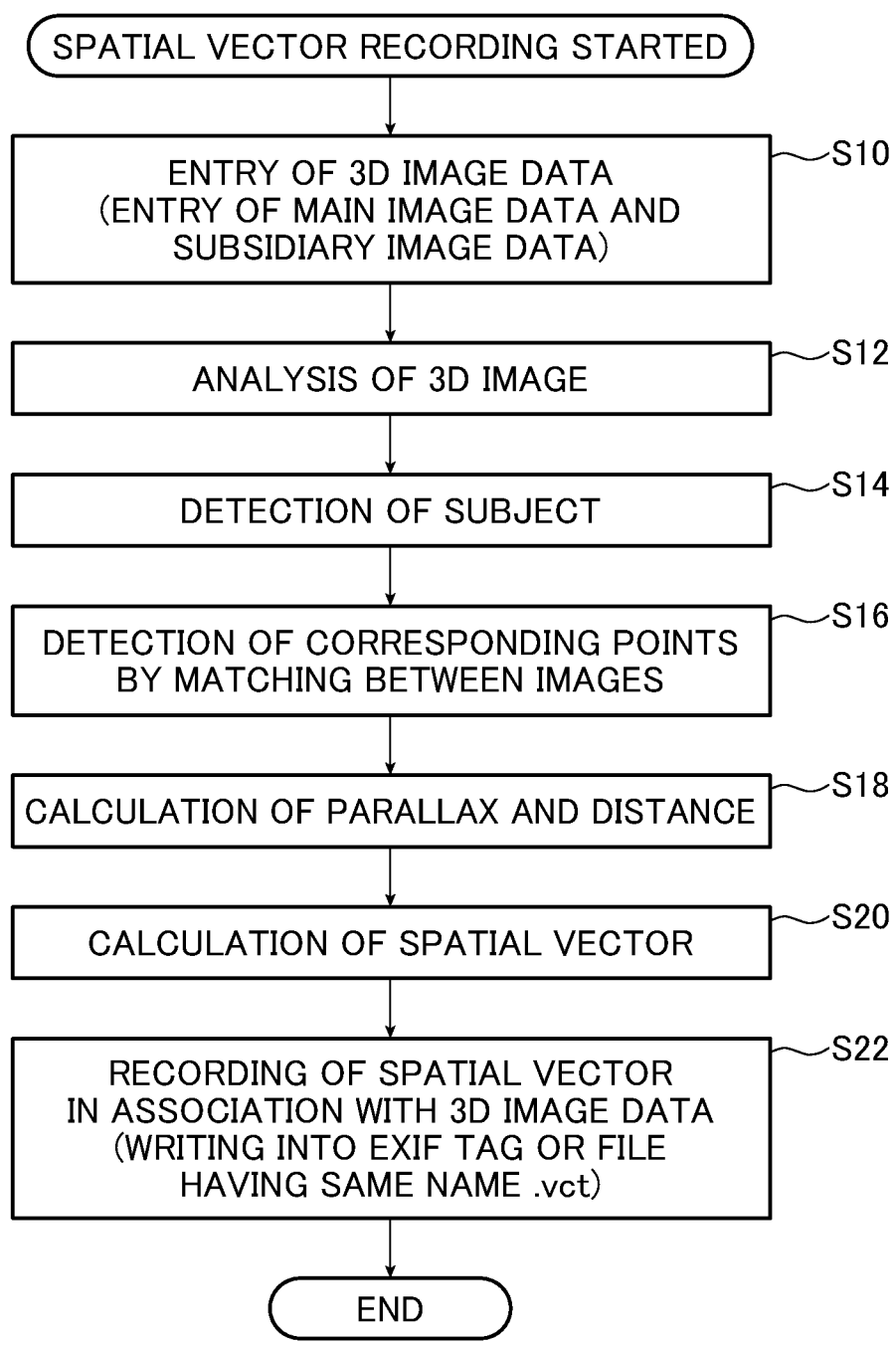
FIG. 4 is a flowchart illustrating an example of flow of operation performed by a first embodiment of the image processing device according to the present invention.

FIG. 4 is a flowchart indicating an example of the flow of the first embodiment of the image processing method according to the present invention.

First, three-dimensional image data, a material, is entered via the image data input unit 12 (step S10). The three-dimensional image data are entered in the subject extraction unit 14, whereupon the three-dimensional image is analyzed (step S12) to extract the subject (step S14). The regions of the subject's individual bodily portions such as face, left and right hand, trunk, and legs are extracted to produce and output information on the subject and the subject's bodily portions as subject information.

The three-dimensional image data and the subject information are entered in the spatial vector calculating unit 16, where the template matching of the subject between main image data and subsidiary image data contained in the three-dimensional image data is performed to detect corresponding points (step S16). Based on the results of detection of corresponding points, the parallax and the distance are calculated for the subject or separately for each of the subject's bodily portions (step S18). From the calculated parallax and distance, the values of the spatial vector on the individual axes are calculated to obtain and output the spatial vector (step S20).

Figure 5:
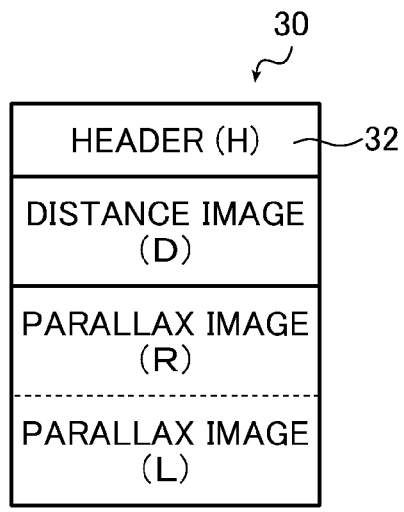
FIG. 5 is an explanatory view illustrating an example of a file structure of a three-dimensional image data.

The three-dimensional image data and the spatial vector are entered into the three-dimensional image data recording unit 18, whereupon the spatial vector and the three-dimensional image data are associated with each other or, in other words, the spatial vector is written into the Exif tag of the three-dimensional image data or outputted to a separate file and recorded (step S22). In the case illustrated in FIG. 5, for example, the spatial vector is written into the Exif tag in a header 32 of three-dimensional image data 30.

Figure 6:
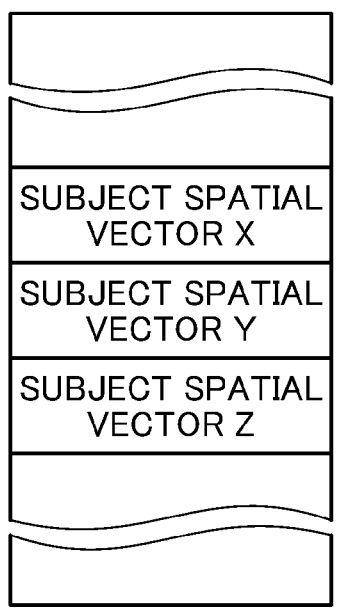
FIG. 6 is an explanatory view illustrating an example of headers of a file of a three-dimensional image data.
Figure 7:
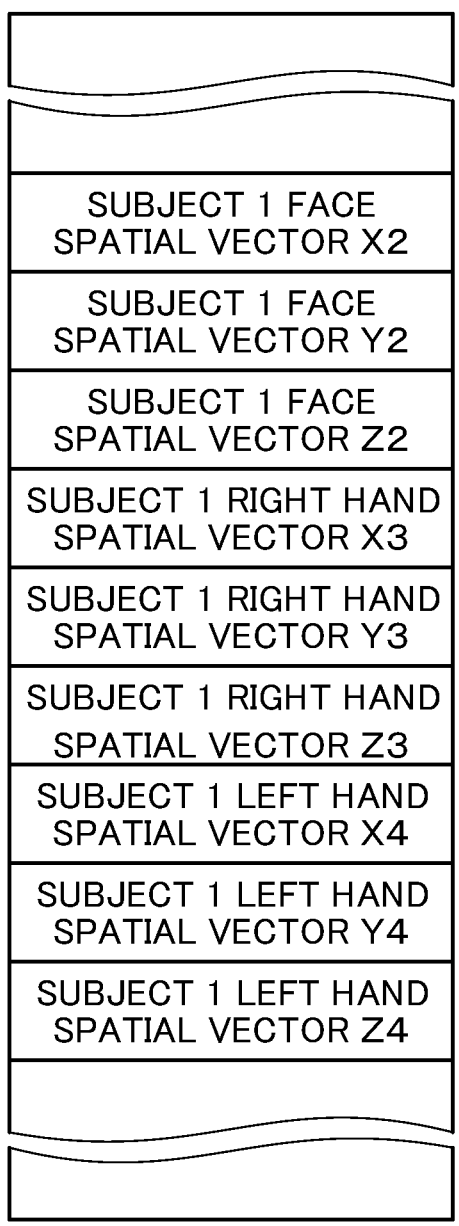
FIG. 7 is an explanatory view illustrating another example of headers of a file of a three-dimensional image data.

FIG. 6 illustrates a case where only the spatial vector of the subject is recorded, and FIG. 7 illustrates a case where the spatial vectors of the subject's bodily portions are recorded, as an example of recording into the Exif tag in the header 32.

Thus, a three-dimensional image that appears more natural and allows ready perception of depth can be obtained by recording a spatial vector and three-dimensional image data associated with each other and synthesizing a three-dimensional image from three-dimensional image data using the spatial vector.

Next, a case using the spatial vector of the subject's face direction (face spatial vector) will be described as a second embodiment.

The second embodiment calculates a spatial vector with a still higher accuracy by additionally detecting the face direction as compared with the image processing device according to the first embodiment.

Figure 8:
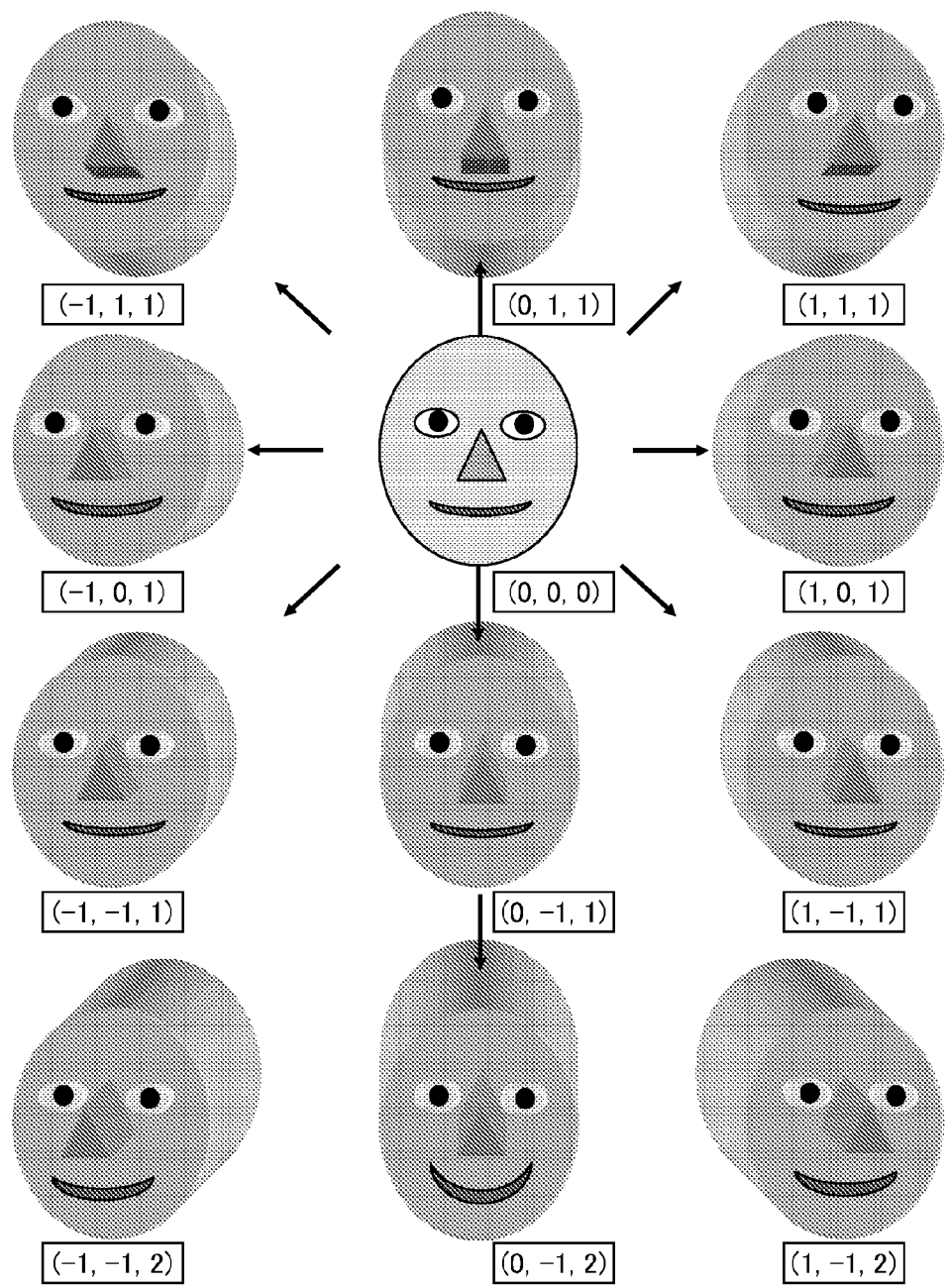
FIG. 8 is an explanatory view illustrating an example of directions of a subject's face directions and spatial vectors.

FIG. 8 illustrates an example of subject's face directions and spatial vectors. Similarly to the spatial vector of the subject, the spatial vector of the face direction is also represented by coordinates (X, Y, Z). For example, the spatial vector of a face direction represented by (−1, 1, 1) as illustrated at top left in FIG. 8 indicates that the face is directed upward to the left as seen by the observer and the pop-out amount (Z-axis value) is (1). The same applies to the spatial vectors of other face directions than these.

Figure 9:
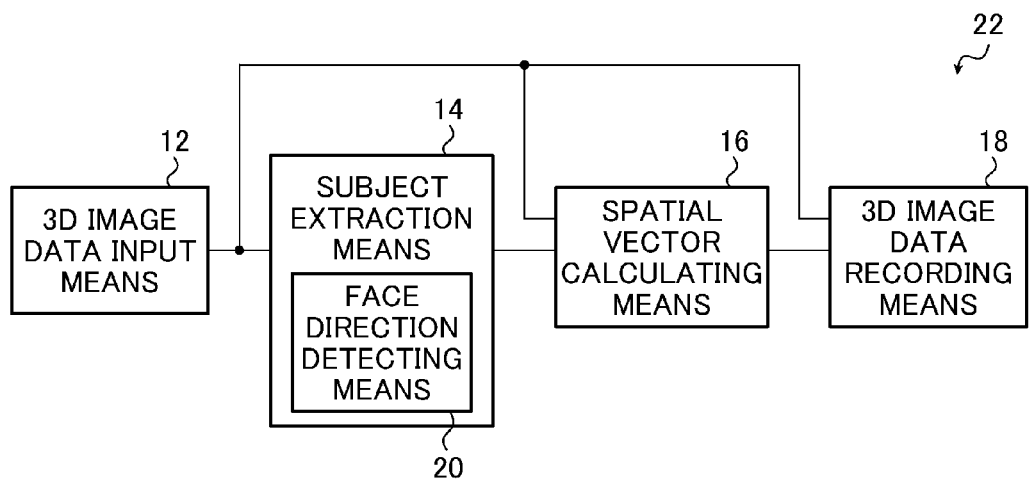
FIG. 9 is a block diagram illustrating a second embodiment of the image processing device according to the present invention.

FIG. 9 is a block diagram of the second embodiment illustrating a configuration of the image processing device 22 of the invention that is different from the first embodiment.

The image processing device 22 basically has the same configuration as the image processing device 10 according to the first embodiment of the invention as illustrated in FIG. 2 except for a face direction detecting unit 20 additionally provided in the subject extraction unit 14. Thus, like components are given like reference characters and descriptions thereof are omitted.

The face direction detecting unit 20 calculates the vertical direction (angle) and horizontal direction (angle) of the face from the region of the subject's face. The face direction may be detected using any of various methods including known methods such as a method described in JP 2006-202276 A using machine learning method to detect the positions of points indicating landmarks from a face image and a method described in JP 2004-334836 A whereby a given size of image data is cut out and compared with image data representing a characteristic portion. Face recognition may be made to recognize a plurality of persons' faces or the face of a particular person. For particular persons out of a plurality of persons, bodily portions including the face may be detected, and, for the remaining persons, only the face may be detected. Information on the face direction is also outputted as subject information.

According to this embodiment, the face direction detecting unit 20 is provided inside of the subject extraction unit 14 but may be provided outside of the subject extraction unit 14.

The spatial vector calculating unit 16 uses the parallax, the distance, and information on the face direction contained in the subject information to calculate the values of the face spatial vector on the individual axes.

Next, the operation of the image processing device 22 of the invention, the second embodiment of the image processing device of the invention, will be described.

Figure 10:
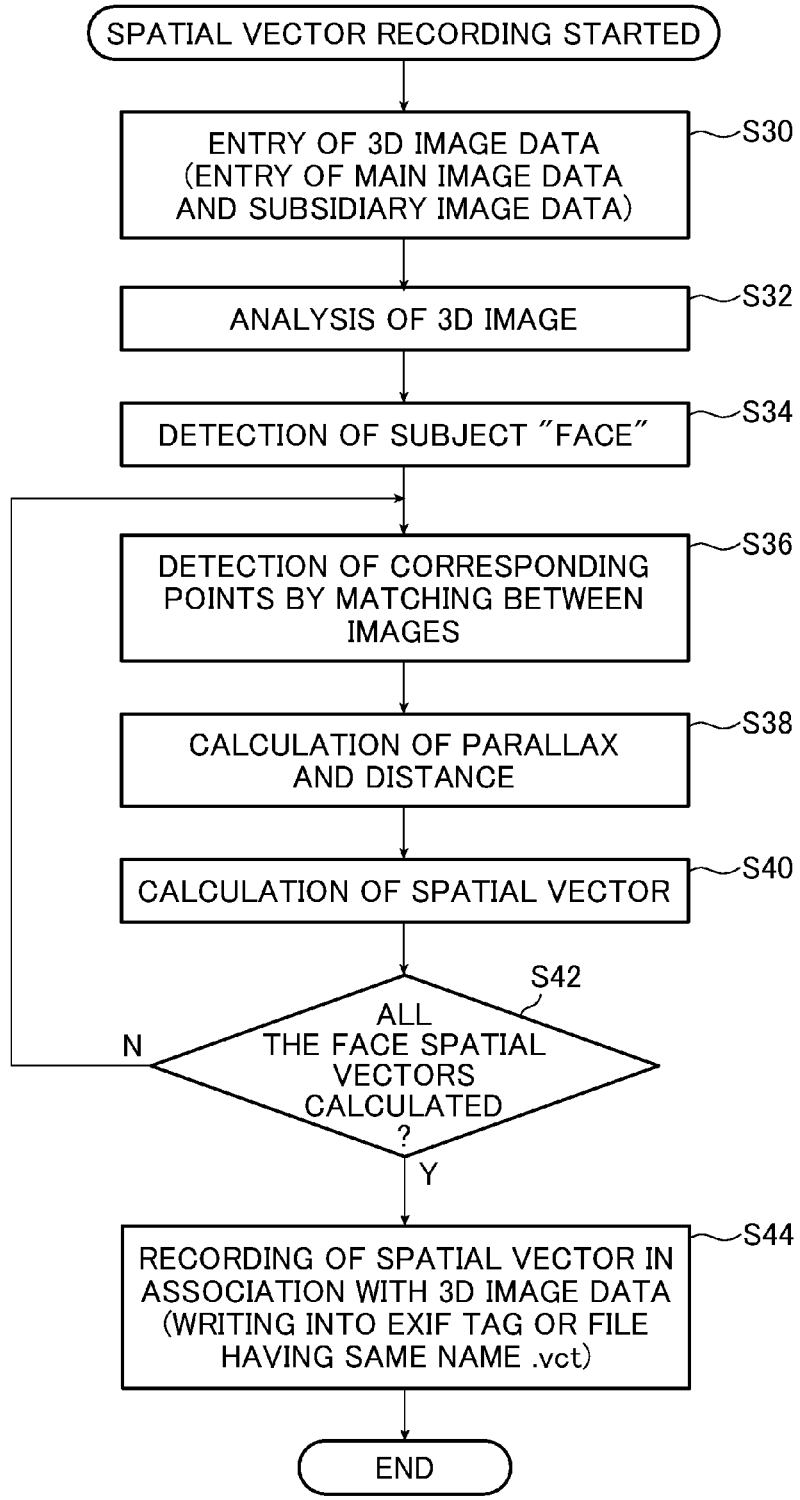
FIG. 10 is a flowchart illustrating an example of flow of operation performed by the second embodiment of the image processing device according to the present invention.

FIG. 10 is a flowchart indicating an example of the flow of the image processing method according to the second embodiment of the present invention.

First, three-dimensional image data, a material, are entered via the image data input unit 12 (step S30). The three-dimensional image data are entered into the subject extraction unit 14, whereupon the three-dimensional image is analyzed (step S32) to detect the subject's face (step S34). The face direction detecting unit 20 detects the subject's face direction to produce and output information on the subject and the subject's face direction as subject information.

The three-dimensional image data and the subject information are entered into the spatial vector calculating unit 16, where the template matching of the subject (face) between main image data and subsidiary image data contained in the three-dimensional image data is performed to detect corresponding points (step S36). Based on the results of detection of corresponding points, the parallax and the distance are calculated separately for the subject and for the subject's face (step S38). The calculated parallax, distance, and face direction are used to calculate the values of the spatial vector (including face spatial vector) on the individual axes thereby to obtain and output the spatial vector (step S40).

When the spatial vector has been obtained, a judgment is made as to whether the spatial vector has been calculated for all the persons represented in the three-dimensional image (step S42) and, when the spatial vector has not been calculated for all the persons, the process returns to step S36 to obtain the spatial vector for the remaining persons ("N" in step S42).

Figure 11:
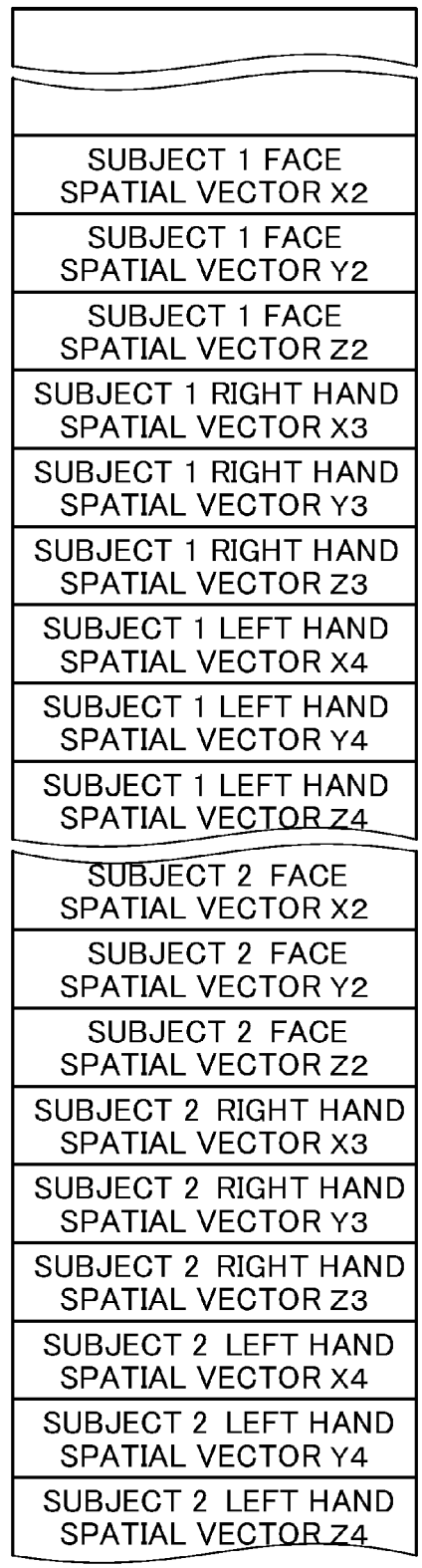
FIG. 11 is an explanatory view illustrating another example of headers of a file of a three-dimensional image data.

When the calculation of the spatial vector is complete for all the persons ("Y" in step S42), the three-dimensional image data and the spatial vector (including the face spatial vector) are entered into the three-dimensional image data recording unit 18, whereupon the spatial vector and the three-dimensional image data are associated with each other or, in other words, the spatial vector is written into the Exif tag of the three-dimensional image data or outputted to a separate file and recorded (step S44). FIG. 11 illustrates an example of entered spatial vectors into Exif tags. As illustrated by way of example, spatial vectors including the face spatial vector may be recorded.

Thus, the accuracy with which a subject is extracted can be enhanced and a three-dimensional image that appears more natural and allows ready perception of depth can be obtained by having recorded the face spatial vector and the three-dimensional image data associated with each other and synthesizing a three-dimensional image from three-dimensional image data using the face spatial vector.

Next, the three-dimensional image printing system, a third embodiment, comprising the image processing device that combines three-dimensional image data and a three-dimensional image template and the three-dimensional image printing device that prints three-dimensional image data will be described.

The third embodiment enables a three-dimensional image with increased entertaining qualities to be obtained by combining three-dimensional image data with a template containing, for examples, a character in addition to the processing performed by the image processing device of the second embodiment.

Figure 12:
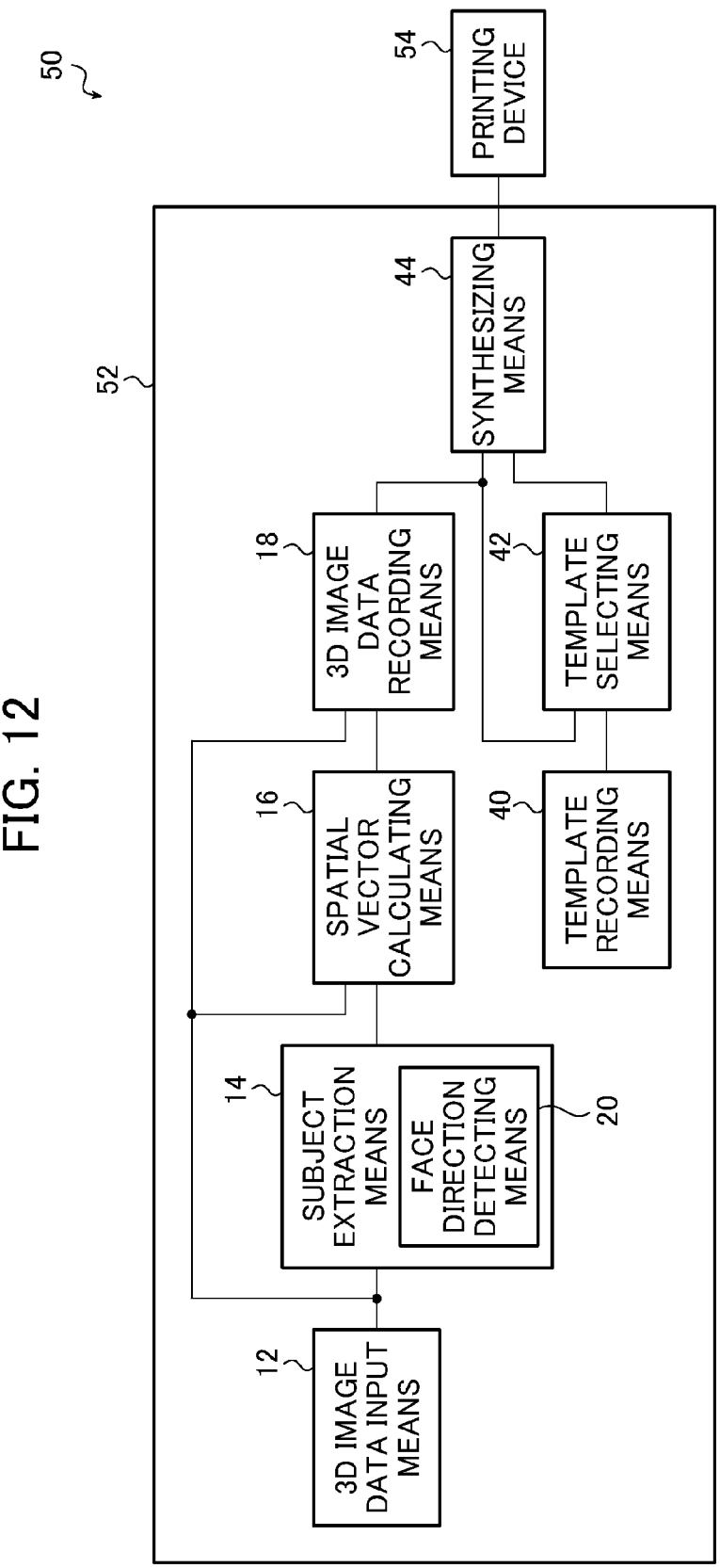
FIG. 12 is a block diagram illustrating a three-dimensional image printing system that is a third embodiment of the present invention.

FIG. 12 is a block diagram of the third embodiment illustrating a configuration of a three-dimensional image printing system 50 according to the invention that is different from the first and the second embodiment described above.

As compared with the image processing device 22 according to the second embodiment of the invention illustrated in FIG. 9, the three-dimensional image printing system 50 comprises an image processing device 52 further provided with a template recording unit 40, a template selecting unit 42, and a synthesizing unit 44 and a printing device 54. The image processing device 52 basically has the same configuration. Thus, like components are given like reference characters and descriptions thereof are omitted.

The template recording unit 40 has therein recorded a plurality of kinds of three-dimensional image data templates to be combined with user three-dimensional data. Three-dimensional image templates for synthesis include those containing characters of, for example, a theme park and enabling a three-dimensional image to be obtained in which a subject represented in a user three-dimensional image (user image) is combined with a character represented in a three-dimensional image template.

The template selecting unit 42 is inputted with spatial vectors recorded in association with three-dimensional image data (including subject information) from the three-dimensional image data recording unit 18 and a three-dimensional image template from the template recording unit 40. The template selecting unit 42 selects a given number of appropriate three-dimensional image templates according to the spatial vector and the face direction from among a plurality of kinds of three-dimensional image templates stored in the template recording unit 40 and has them displayed on a display device, not shown. The template selecting unit 42 outputs a three-dimensional image template selected by the user through an input unit, now shown, from among a given number of three-dimensional image templates displayed on the display device.

Although, according to this embodiment, the information on the subject's face direction contained in the subject information entered from the subject extraction unit 14 into the spatial vector calculating unit 16 (subject information) is outputted together with the spatial vector from the spatial vector calculating unit 16, the output may be effected otherwise according to the invention; the information on the subject's face direction (subject information) outputted form the subject extraction unit 14 and the spatial vector of the subject outputted from the spatial vector calculating unit 16 may be separately entered into the three-dimensional image data recording unit 18 and the template selecting unit 42.

Now, how the template selecting unit 42 selects a three-dimensional image template will be described.

Figure 13:
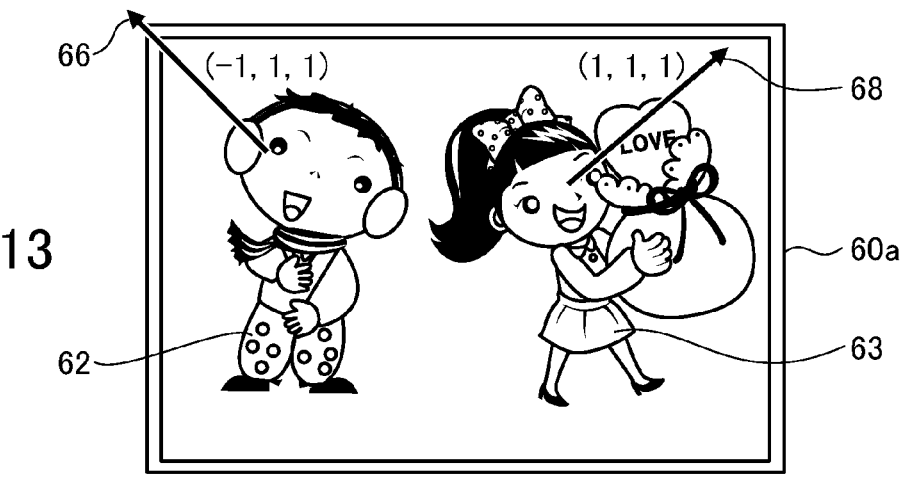
FIG. 13 is an explanatory view illustrating an example of three-dimensional print.

FIG. 13 illustrates an example where a subject 62 of a user three-dimensional image is placed on the left side and a character 63 from a three-dimensional image template is placed on the right side in a three-dimensional image 60*a*. A spatial vector 66 (−1, 1, 1) of the subject 62 represents a line of sight directed upward to the left as seen by the observer while a spatial vector 68 (1, 1, 1) of the character 63 represents a line of sight directed upward to the right as seen by the observer. As they are now positioned, the subject 62 and the character 63 face the opposite direction from each other. Accordingly, an attempt to produce a synthesized three-dimensional print from a synthesized image would result in producing a print causing difficulty in perceiving depth because of the difference in direction between the spatial vectors.

Figure 14:
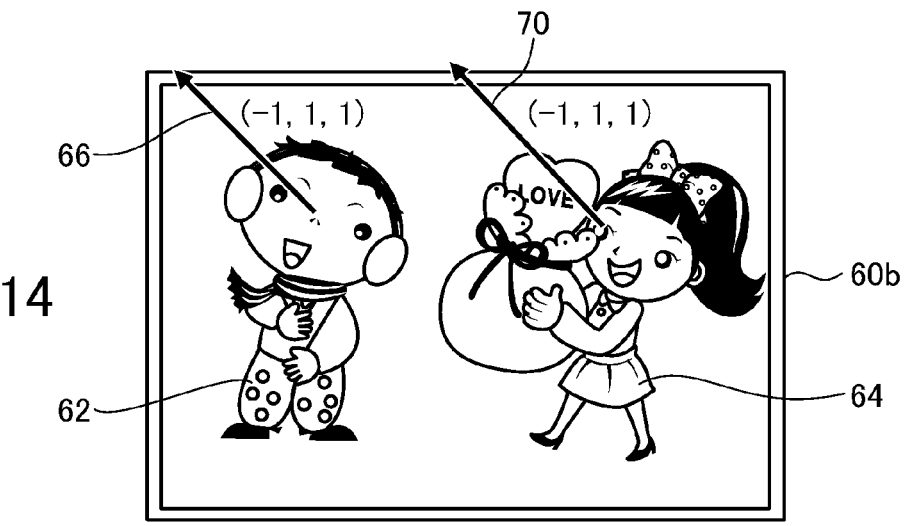
FIG. 14 is an explanatory view illustrating another example of three-dimensional print.
Figure 15:
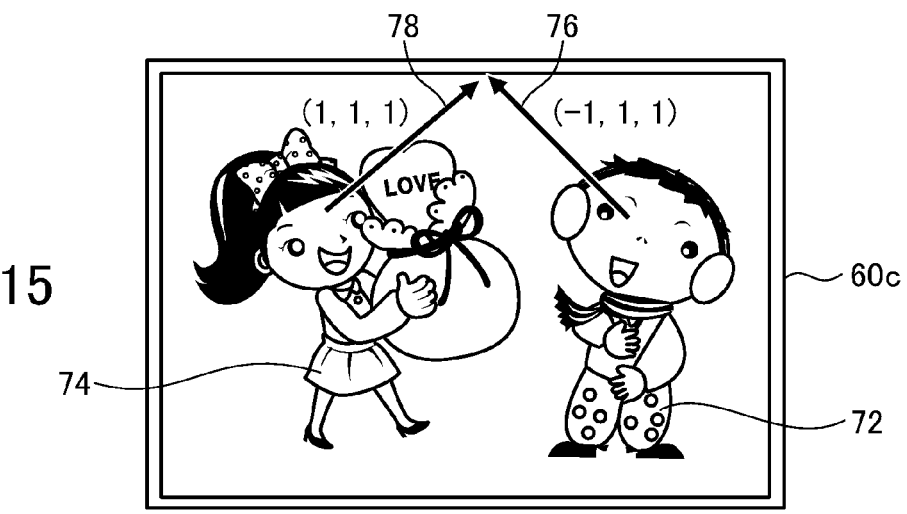
FIG. 15 is an explanatory view illustrating another example of three-dimensional print.

Therefore, the template selecting unit 42 selects an appropriate three-dimensional image template according to the spatial vector of the subject 62 such that a character 64 containing a spatial vector 70 having the same direction component as the spatial vector 66 of the subject 62 as illustrated in FIG. 14 is selected and placed in a position, or the subject and the character change places so as to face each other as in a three-dimensional image 60*c* illustrated in FIG. 15 where a spatial vector 76 of a subject 72 and a spatial vector 78 of a character 74 are directed toward each other.

Table 1 shows an example of matrices containing upwardly directed user spatial vectors from among the combinations of the user's subject spatial vectors, face directions and positions, and the character spatial vectors and face directions from three-dimensional image templates for synthesis (indicated as "char." in Table 1). Appropriate and inappropriate character spatial vectors reverse for downwards directed user spatial vectors with which they are combined.

TABLE 1

|  | USER IMAGE ON LEFT | USER IMAGE AT | USER IMAGE ON RIGHT |
| --- | --- | --- | --- |
| USER SPATIAL UL (−1, 1, 1) | CHAR UL (−1, 1, 1) CHAR UF (0, 1, 1) CHAR HL (−1, 0, 1) CHAR HF (0, 0, 1) | CHAR UL (−1, 1, 1) CHAR UF (0, 1, 1) CHAR UR (1, 1, 1) CHAR HL (−1, 0, 1) CHAR HF (0, 0, 1) CHAR HR (1, 0, 1) | CHAR UL (−1, 1, 1) CHAR UF (0, 1, 1) CHAR UR (1, 1, 1) CHAR HL (−1, 0, 1) CHAR HF (0, 0, 1) CHAR HR (1, 0, 1) |
| USER SPATIAL UF (0, 1, 1) | CHAR UL (−1, 1, 1) CHAR UF (0, 1, 1) CHAR UR (1, 1, 1) CHAR HL (−1, 0, 1) CHAR HF (0, 0, 1) CHAR HR (1, 0, 1) | CHAR UL (−1, 1, 1) CHAR UF (0, 1, 1) CHAR UR (1, 1, 1) CHAR HL (−1, 0, 1) CHAR HF (0, 0, 1) CHAR HR (1, 0, 1) | CHAR UL (−1, 1, 1) CHAR UF (0, 1, 1) CHAR UR (1, 1, 1) CHAR HL (−1, 0, 1) CHAR HF (0, 0, 1) CHAR HR (1, 0, 1) |
| USER SPATIAL UR (1, 1, 1) | CHAR UL (−1, 1, 1) CHAR UF (0, 1, 1) CHAR UR (1, 1, 1) CHAR HL (−1, 0, 1) CHAR HF (0, 0, 1) CHAR HR (1, 0, 1) | CHAR UL (−1, 1, 1) CHAR UF (0, 1, 1) CHAR UR (1, 1, 1) CHAR HL (−1, 0, 1) CHAR HF (0, 0, 1) CHAR HR (1, 0, 1) | CHAR UF (0, 1, 1) CHAR UR (1, 1, 1) CHAR HF (0, 0, 1) CHAR HR (1, 0, 1) |

Suppose that when the subject of a user image is placed on the left side in a three-dimensional image, the character of a character image is placed on the right side of the subject, and when the subject is placed on the right side, the character is placed on the left side. Suppose also that when the subject is placed at the center, the character is placed on either the right side of the subject or the left (as selected by the user).

When the subject faces leftward (upward to the left, horizontally to the left, downward to the left) or rightward (upward to the right, horizontally to the right, downward to the right), and the subject is placed on the left side or the right side, and when the subject faces the character, the character's face direction, either upward or downward, opposite from that in which the subject is directed is judged as inappropriate (not selected). When the subject does not face the character, the character's face direction, either leftward or rightward, opposite from that in which the subject is directed is judged as inappropriate, and the character's face direction, either upward or downward, opposite from that in which the subject is directed is judged as inappropriate When the subject faces leftward or rightward and is placed at the center, whether the subject faces the character or not depends on whether the character is placed on the left side of the subject or the right side. Thus, when the subject is placed at the center, the character's face direction, either upward or downward, opposite from that of the subject's face direction is judged as inappropriate regardless of the subject's left and right face direction.

When the subject's face is directed frontward (upward to the front, horizontally to the front, and downward to the front, the subject's face direction is neutral regardless of the position in which the character is placed whether the subject is placed on the left side, at the center, or on the right side. Thus, when the subject's face direction is directed frontward, the character's face direction, either upward or downward, opposite from that of the subject's face direction is judged as inappropriate regardless of the subject's position and left and right face direction.

When, for example, the subject faces upward to the left and is placed on the left side, the subject does not face the character that is placed on the right side. Accordingly, the character's rightward face direction is judged inappropriate and the character's downward face direction is judged inappropriate. Specifically, out of the character's face directions, those directed rightward including upward to the right, horizontally to the right, and downward to the left are judged inappropriate, those directed downward including downward to the right, downward to the front, and downward to the left are judged inappropriate, and the other directions including upward to the front, upward to the left, horizontally leftward, and horizontally to the front are judged appropriate (selected).

When the subject faces upward to the left and is placed on the right side, the subject faces the character that is placed on the left side. Accordingly, the character's downward face directions are judged inappropriate. Specifically, out of the character's face directions, those directed downward including downward to the right, downward to the front, and downward to the left are judged inappropriate and the other directions including horizontally to the right, upward to the right, upward to the front, upward to the left, horizontally to the left, and horizontally to the front are judged appropriate.

When the subject faces upward to the left and is placed at the center, the character's downward face direction is judged as inappropriate regardless of the subject's rightward or leftward face direction. Specifically, out of the character's face directions, those directed downward including downward to the right, downward to the front, and downward to the left are judged inappropriate and the other directions including horizontally to the right, upward to the right, upward to the front, upward to the left, horizontally to the left, and horizontally to the front are judged appropriate.

When the subject faces upward to the right and is placed on the left side, the composition is the left-right reversal of when the subject faces upward to the left and is placed on the right side. In such a case, the character's inappropriate face directions are reversed in the left-and-right direction in order to obtain appropriate directions, so that the character's downward face directions are judged inappropriate. Specifically, the downward directions including downward to the right, downward to the front, and downward to the left are judged inappropriate, and the other directions including horizontally to the right, upward to the right, upward to the front, upward to the left, horizontally to the left, and horizontally to the front are judged appropriate.

When the subject faces upward to the right and is placed on the right side, the composition is the left-right reversal of when the subject faces upward to the left and is placed on the left side. Therefore, the character's inappropriate face directions are reversed in the left-and-right direction, so that the character's leftward face directions are judged inappropriate and the character's downward face directions are judged inappropriate. Specifically, the character's face directions that are judged inappropriate are those directed leftward including upward to the left, horizontally to the left, downward to the left and those directed downward including downward to the right, downward to the front, and downward to the left are judged inappropriate, whereas the other directions including horizontally to the right, upward to the right, upward to the front, and horizontally to the front are judged appropriate.

When the subject faces upward to the right and is placed at the center, the composition is the left-right reversal of when the subject faces upward to the left and is placed at the center. Accordingly, the character's inappropriate face directions are likewise reversed in the left-and-right direction in order to obtain appropriate directions, so that the character's downward face directions are judged inappropriate. Specifically, those directed downward including downward to the right, downward to the front, and downward to the left are judged inappropriate, and the other directions including horizontally to the right, upward to the right, upward to the front, upward to the left, horizontally to the left, and horizontally to the front are judged appropriate.

When the subject faces upward to the front, the character's downward face directions are judged as inappropriate regardless of the subject's position and left and right face direction. Specifically, those directed downward including downward to the right, downward to the front, and downward to the left are judged inappropriate, and the other directions including horizontally to the right, upward to the right, upward to the front, upward to the left, horizontally to the left, and horizontally to the front are judged appropriate.

Figure 16:
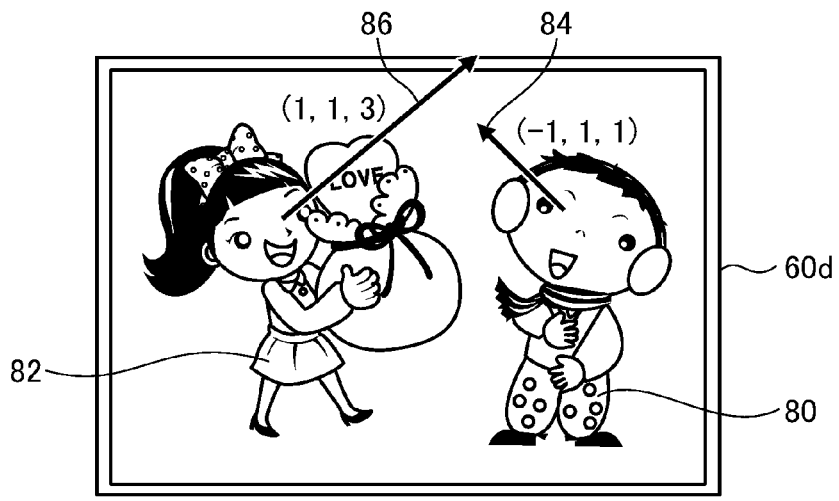
FIG. 16 is an explanatory view illustrating another example of three-dimensional print.
Figure 17:
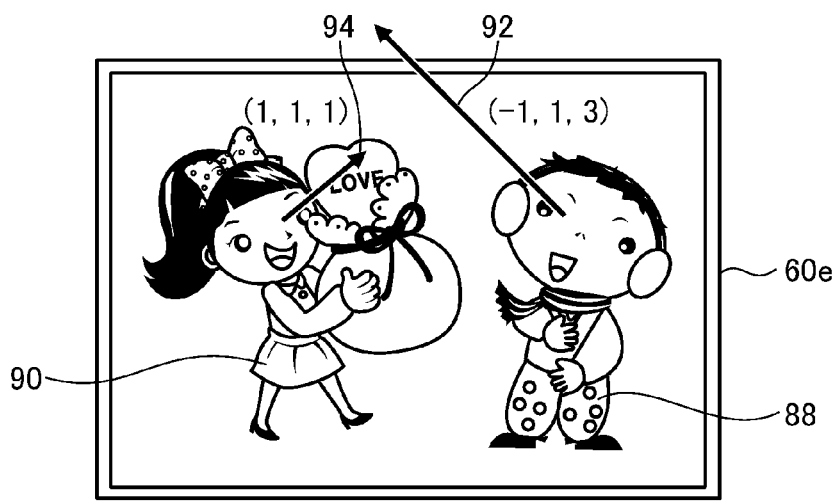
FIG. 17 is an explanatory view illustrating another example of three-dimensional print.

The three-dimensional image template may be selected considering the magnitude of the spatial vector. FIG. 16 illustrates a case where, for example, a spatial vector 86 of a character 82 has a greater pop-out amount than a spatial vector 84 of a subject 80 in a three-dimensional image 60d; FIG. 17 illustrates a case where a spatial vector 92 of a subject 88 has a greater pop-out amount than a spatial vector 94 of a character 90 in a three-dimensional image 60e. Such combinations of a subject and a character having spatial vectors excessively different in magnitude may be excluded from choices.

Although the subject's pop-out amount is (3) in the examples illustrated in FIGS. 16 and 17, the pop-out amount may differ between the subject and the character within a range such that the balance between them is maintained. To be specific, let (N), for example, be the subject's pop-out amount, then the character's pop-out amount is preferably greater than N/3 and smaller than 3N.

Table 2 shows an example of a matrix of combinations of the spatial vectors and positions of a user subject and a character's spatial vectors where the magnitude of spatial vectors is also considered.

TABLE 2

|  | USER IMAGE ON LEFT | USER IMAGE AT CENTER | USER IMAGE ON RIGHT |
| --- | --- | --- | --- |
| USER SPATIAL VECTOR UL (−1, 1, 3) | CHAR UL (−1, 1, 1) CHAR UF (0, 1, 3) CHAR DL (−1, 0, 3) CHAR HF (0, 0, 3) | CHAR UL (−1, 1, 3) CHAR UF (0, 1, 3) CHAR UR (1, 1, 3) CHAR DL (−1, 0, 3) CHAR HF (0, 0, 3) CHAR HR (1, 0, 3) | CHAR UL (−1, 1, 3) CHAR UF (0, 1, 3) CHAR UR (1, 1, 3) CHAR DL (−1, 0, 3) CHAR HF (0, 0, 3) CHAR HR (1, 0, 3) |

Figure 18:
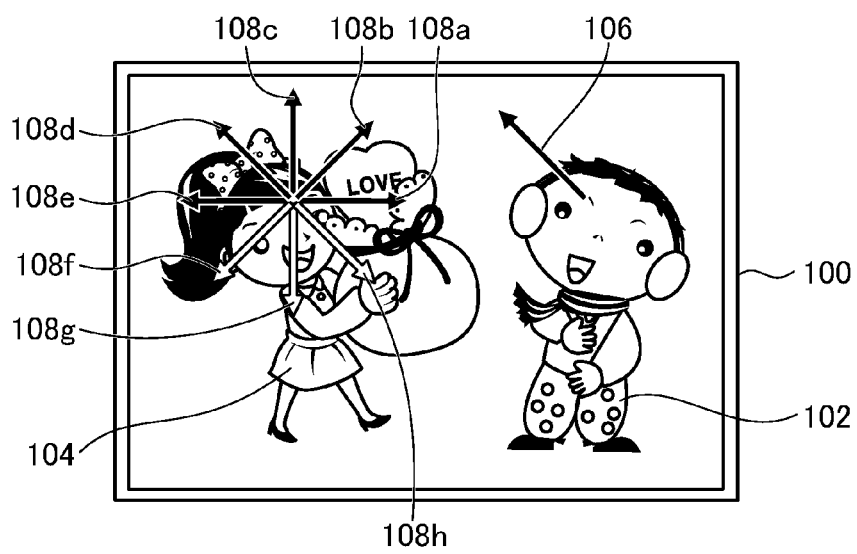
FIG. 18 is an explanatory view illustrating another example of three-dimensional print.
Figure 19:
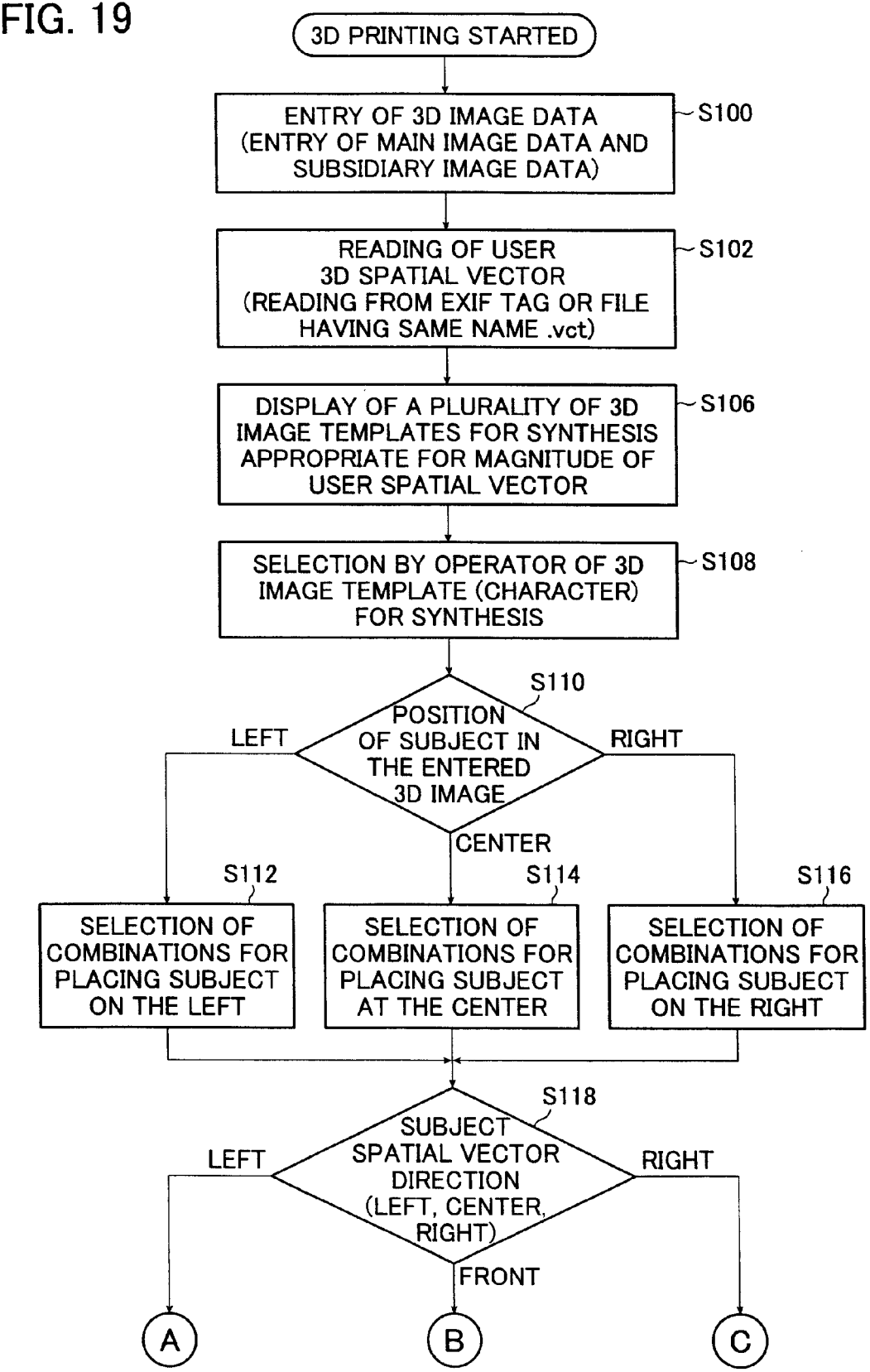
FIG. 19 is a flowchart illustrating an example of flow of operation performed by the third embodiment of the three-dimensional image printing system according to the present invention.
Figure 20:
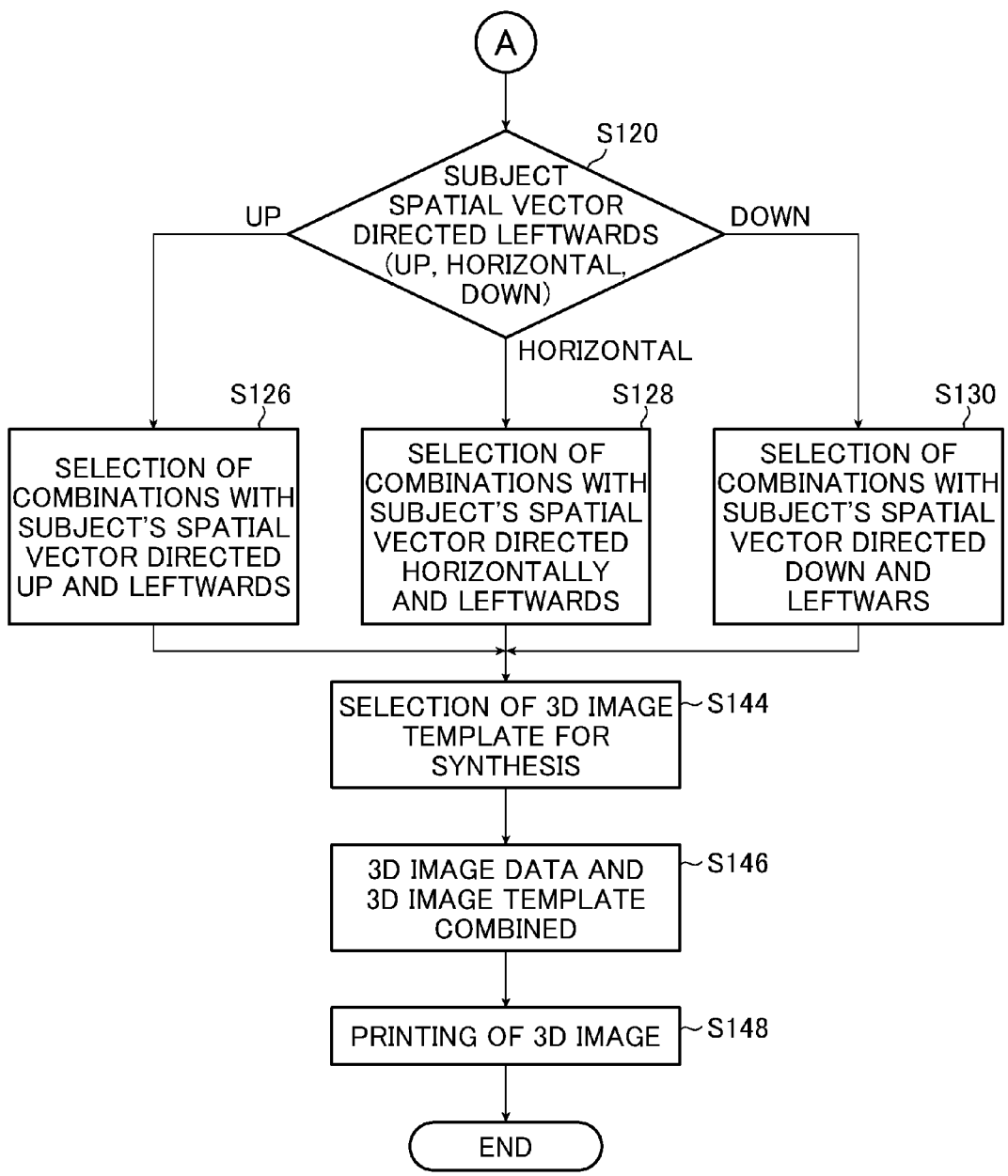
FIG. 20 illustrates a flowchart following the flowchart of FIG. 19.
Figure 21:
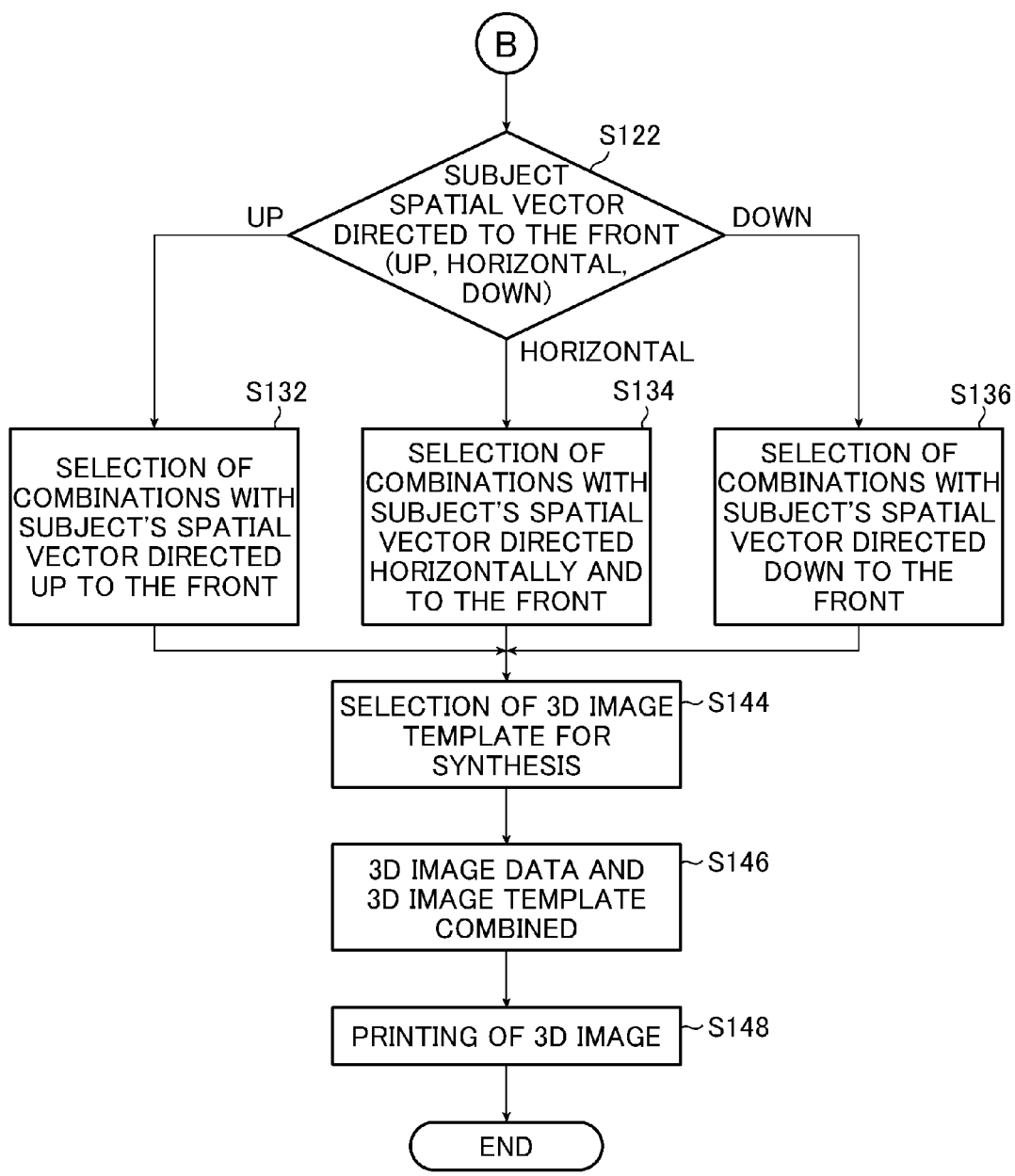
FIG. 21 illustrates a flowchart following the flowchart of FIG. 19.
Figure 22:
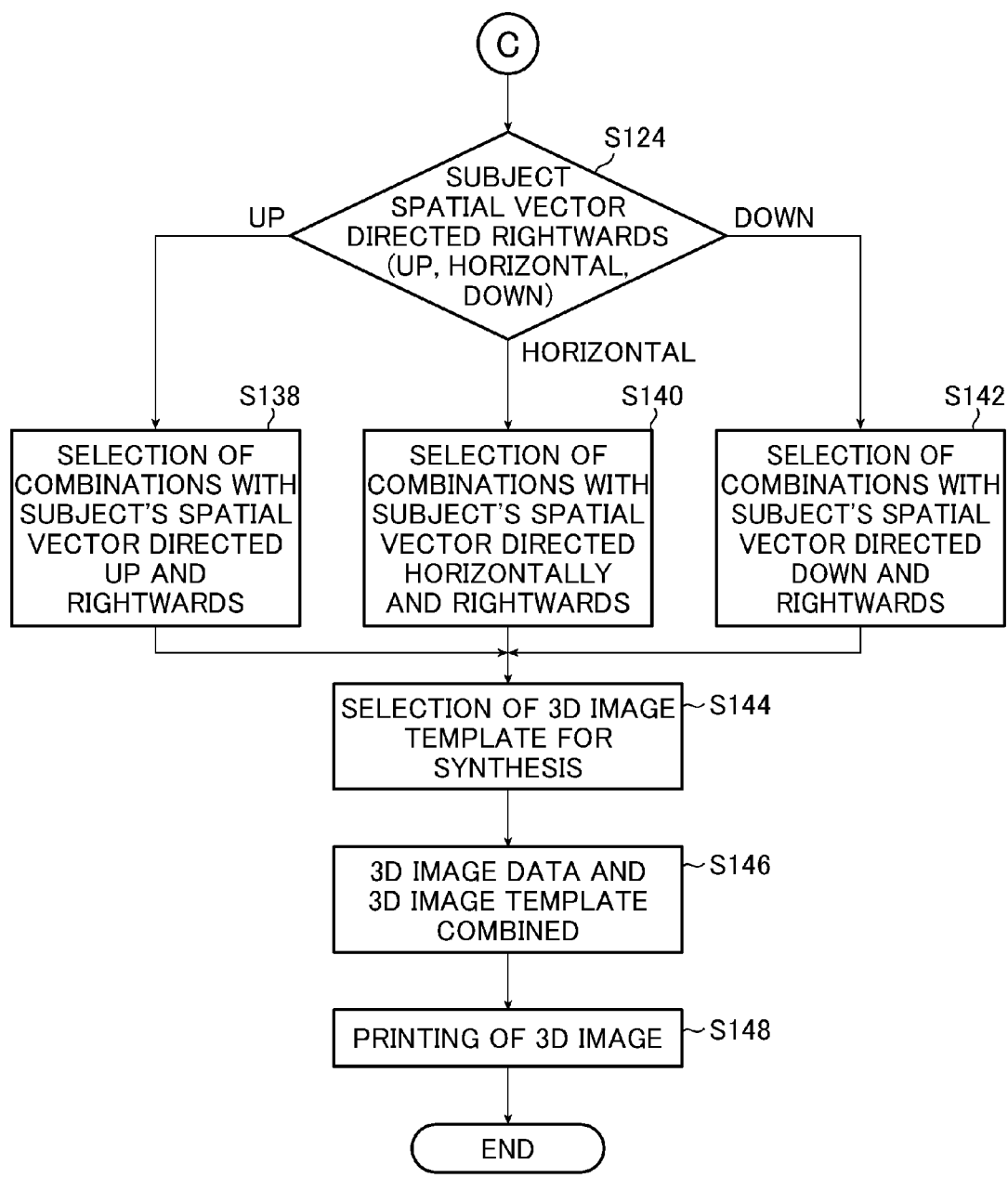
FIG. 22 illustrates a flowchart following the flowchart of FIG. 19.

Further, as illustrated in FIG. 18, the character's spatial vectors that can be appropriately combined with the subject may be each allotted an order of priority to permit selection of a three-dimensional image template according to the order of priority. As illustrated in Table 3, for example, when a user spatial vector is represented as (−1, 1, 1), the order of priority is assigned such that out of spatial vectors 108a to 108h of a character 104, 108b is assigned the first place in the order of priority, 108d is assigned the second place, and so forth for a spatial vector 106 of a subject 102 in a three-dimensional image 100, and such inappropriate combinations including the spatial vectors 108f, 108g, and 108h are judged inappropriate and excluded from selection.

TABLE 3

|  | USER IMAGE ON RIGHT | ORDER OF PRIORITY |
|---|---|---|
| USER SPATIAL VECTOR | CHAR UL (−1, 1, 1): (108d) | 2 |
| UL (−1, 1, 1) | CHAR UF (0, 1, 1): (108c) | 4 |
|  | CHAR UR (1, 1, 1): (108b) | 1 |
|  | CHAR HL (−1, 0, 1): (108e) | 5 |
|  | CHAR HF (0, 0, 1) | 6 |
|  | CHAR HR (1, 0, 1 ): (108a) | 3 |
|  |  | INAPPROPRIATE |
|  |  | INAPPROPRIATE |
|  |  | INAPPROPRIATE |

In lieu of using the order of priority, the directions of these spatial vectors may be displayed on a preview screen to allow the user to perform selection. Further, to economize on the amount of storage, a combination closest to the most appropriate may be provided in lieu of all the possible combinations.

The synthesizing unit 44 is inputted with three-dimensional image data associated with spatial vectors from the three-dimensional image data recording unit 18 and a three-dimensional image template selected by the template selecting unit 42. The synthesizing unit 44 combines the three-dimensional image data and the three-dimensional image template selected by the template selecting unit 42 (i.e., the subject of the three-dimensional image and the character of the three-dimensional image template) to produce and output synthesized three-dimensional image data representing a synthesized three-dimensional image.

The printing device 54 is inputted with the synthesized three-dimensional image data from the synthesizing unit 44. The printing device 54 is a printer capable of printing out the synthesized three-dimensional image corresponding to the synthesized three-dimensional image data. The three-dimensional image may be printed, for example, in such a manner that an image is cut into a plurality of strips and arranged alternately to enable printing permitting depth perception using a parallax barrier or a lenticular lens.

Next, the operation of the three-dimensional image printing system 50 of the invention, the third embodiment of the invention, will be described.

FIGS. 19 to 22 are flowcharts illustrating an example of the flow of the image processing method according to the third embodiment of the present invention.

First, three-dimensional image data, a material, are entered via the image data input unit 12 (step S100). As in the second embodiment described above, the subject (user) and the face direction are detected, and the spatial vector is calculated from the three-dimensional image data, whereupon the three-dimensional image data (user three-dimensional image data) and the spatial vector (user spatial vector) are associated and stored in the three-dimensional image data recording unit 18.

Further, appropriate three-dimensional image templates are read from the template recording unit 40 based on the subject (user) information (including face direction information) and the user spatial vector, and a plurality of them are displayed at a time on a display device, not shown (step S106), for the operator to select a three-dimensional image template (character) for synthesis (step S108). In selection of three-dimensional image templates (characters), the position is yet to be determined. The three-dimensional image template (character) for synthesis may be selected automatically.

Upon selection of a three-dimensional image template (character) for synthesis, the position of the subject in the three-dimensional image data is detected or selected (step S110). When the subject (user) is positioned on the left side ("LEFT" in step S110), combinations where the subject is positioned on the left side are selected (step S112); when the subject is positioned at the center ("CENTER" in step S110), combinations where the subject is positioned at the center are selected (step S114); and when the subject is positioned on the right side ("RIGHT" in step S110), combinations where the subject is positioned on the right side are selected (step S116).

Then, combinations are selected according to the subject spatial vector (user spatial vector). When the spatial vector is directed leftward in the left-and-right direction ("LEFT" in step S118) and upward in the up-and-down direction ("UP" in step S120), combinations where the user spatial vector is directed upward to the left are selected (step S126). Likewise, when the spatial vector is directed leftward in the left-and-right direction ("LEFT" in step S118) and horizontal in the up-and-down direction ("HORIZONTAL" in step S120), combinations where the user spatial vector is directed in a leftward and horizontal direction is selected (step S128). When the spatial vector is directed leftward in the left-and-right direction ("LEFT" in step S118) and downward in the up-and-down direction ("DOWN" in step S120), combinations where the user spatial vector is directed downward to the left is selected (step S130).

When the spatial vector is directed toward the front in the left-and-right direction ("FRONT" in step S118), combinations where the spatial vector is directed upward to the front, horizontally to the front, or downward to the front are likewise selected in steps S122, S132 to S136. When the spatial vector is directed to the right in the left-and-right direction ("RIGHT" in step S118), combinations where the spatial vector is directed upward to the right, horizontally to the right, or downward to the right are likewise selected in steps S124, S138 to S142.

Upon selection of combinations based on the user spatial vector, a plurality of three-dimensional image templates that can be appropriately used for synthesis are presented for selection according to the positional relationship between the subject (user) and the character contained in the combinations so that the operator may select a three-dimensional image template containing a character placed in a unique position and having a unique spatial vector (step S144). Alternatively, a three-dimensional image template containing a character whose position and spatial vector are considered the most appropriate may be automatically selected.

The three-dimensional image template containing a character with a position and a spatial vector and three-dimensional image data are entered into the synthesizing unit 44. The three-dimensional image template containing a character with a position and a spatial vector and three-dimensional image data are combined to produce and output synthesized three-dimensional image data (step S146).

The synthesized three-dimensional image data are entered into the printing device 54 to print a three-dimensional image (step S148).

Thus, based on the subject's position and spatial vector (user spatial vector), the user need only select a preferred three-dimensional image template for synthesis without being conscious of the spatial vector value to preclude the possibility of an inappropriate three-dimensional image template being selected, thus increasing the user's satisfaction.

Further, a three-dimensional print representing a three-dimensional image with increased entertaining qualities and producing increased satisfaction can be obtained by changing the position and the spatial vector of a character in the three-dimensional image template according to the position of the subject, i.e., by selecting a three-dimensional image template whose character, together with the subject, produces a sense of depth in the most appropriate manner.

The steps taken in the above image processing method may be configured into an image processing program for causing a computer to execute the steps of the image processing method described above, or may be configured into an image processing program enabling a computer to function as means for executing the respective steps of the image processing method or to function as means for forming components of the image processing device described above.

Further, the above image processing program may be configured in the form of a computer readable medium or a computer readable memory.

While the image processing device, the three-dimensional image printing system, and the image processing method and program according to the invention have been described in detail above, the present invention is not limited to the above embodiments, and various modifications may be made without departing from the spirit and scope of the invention.

I claim:

1. An image processing device, comprising:
a three-dimensional image data input unit implemented by a programmed processor and configured to enter three-dimensional image data representing a three-dimensional image;
a subject extraction unit implemented by the programmed processor and configured to extract a subject from the three-dimensional image data;
a spatial vector calculating unit implemented by the programmed processor and configured to calculate a spatial vector of the subject from a plurality of planar image data having different viewpoints contained in the three-dimensional image data;
a three-dimensional image data recording unit implemented by the programmed processor and configured to record the spatial vector and the three-dimensional image data in association with each other;
a template recording unit implemented by the programmed processor and configured to record a plurality of kinds of three-dimensional image templates;
a template selecting unit implemented by the programmed processor and configured to select a given number of three-dimensional image templates according to the spatial vector recorded in association with the three-dimensional image data from among a plurality of kinds of three-dimensional image templates recorded in the template recording unit, said given number being at least two; and
a synthesizing unit implemented by the programmed processor and configured to combine the three-dimensional image data with one three-dimensional image template selected by a user from among the given number of three-dimensional image templates selected by the template selecting unit to produce and output synthesized three-dimensional image data representing a synthesized three-dimensional image,
wherein the spatial vector represents three-dimensional data having X, Y and Z axis contained in the three-dimensional image data, where the X and the Y axis correspond respectively to a horizontal axis and a vertical axis of the planar image data, and the Z axis is an axis perpendicular to a plane formed by the X and the Y axis of the planar image data and indicates a direction in which the subject pops out,
wherein the subject extraction unit further extracts a face of the subject,
wherein a face direction detecting unit which detects the subject's face direction is further provided,
wherein the spatial vector calculating unit uses the face direction to calculate a face spatial vector,
wherein the template selecting unit further selects the three-dimensional image template according to the subject's face direction and the subject's position in the three-dimensional image, and
wherein the template selecting unit performs selection such that when the subject faces leftward or rightward and is placed on a left side or on a right side in the three-dimensional image and a character contained in the three-dimensional image template is placed on the left side or on the right side, and when the subject's face direction is directed toward the character, three-dimensional image templates containing the character's up-and-down face directions opposite from the subject's face direction are not selected, whereas when the subject's face direction is not directed toward the character, three-dimensional image templates containing the character's left-and-right face directions opposite from the subject's face direction are not selected and three-dimensional image templates containing the character's up-and-down face directions opposite from the subject's face direction are not selected, while three-dimensional image templates containing a character directed toward other directions are selected.

2. The image processing device according to claim 1,
wherein the subject extraction unit extracts a plurality of the subject's bodily portions, and
wherein the spatial vector calculating unit calculates spatial vectors of the plurality of the subject's bodily portions.

3. The image processing device according to claim 2,
wherein the three-dimensional image data recording unit records a greatest spatial vector among spatial vectors of the plurality of the subject's bodily portions and the three-dimensional image data in association with each other.

4. The image processing device according to claim 1,
wherein the three-dimensional image data recording unit records the subject's spatial vector in an Exif tag of the three-dimensional image data.

5. The image processing device according to claim 1,
wherein the three-dimensional image data recording unit records the subject's spatial vector in a file other than a file of the three-dimensional image data.

6. The image processing device according to claim 1,
wherein the spatial vector calculating unit calculates a parallax of the subject and the distances from the viewpoints to the subject from the plurality of planar image data having different viewpoints and calculates the spatial vector of the subject from the plurality of planar image data having different viewpoints, the parallax, and the distances.

7. The image processing device according to claim 1,
wherein the template selecting unit selects a three-dimensional image template containing a character whose pop-out amount is greater than N/3 and smaller than 3N, N being the subject's pop-out amount.

8. The image processing device according to claim 1,
wherein the template selecting unit sets an order of priority in a character's pop-out amount and face direction contained in the three-dimensional image template and selects the three-dimensional image template according to the order of priority.

9. The image processing device according to claim 1,
wherein the template selecting unit displays the pop-out amount and the face direction of a character contained in the three-dimensional image template on a preview screen and selects one three-dimensional image template selected by the user from among a plurality of three-dimensional image templates displayed on the preview screen.

10. A three-dimensional image printing system, comprising:
the image processing device described in claim 1; and
a printing device for printing a synthesized three-dimensional image corresponding to synthesized three-dimensional image data outputted from the image processing device.

11. An image processing device, comprising:
a three-dimensional image data input unit implemented by a programmed processor and configured to enter three-dimensional image data representing a three-dimensional image;
a subject extraction unit implemented by the programmed processor and configured to extract a subject from the three-dimensional image data;
a spatial vector calculating unit implemented by the programmed processor and configured to calculate a spatial vector of the subject from a plurality of planar image data having different viewpoints contained in the three-dimensional image data;
a three-dimensional image data recording unit implemented by the programmed processor and configured to record the spatial vector and the three-dimensional image data in association with each other;
a template recording unit implemented by the programmed processor and configured to record a plurality of kinds of three-dimensional image templates;
a template selecting unit implemented by the programmed processor and configured to select a given number of three-dimensional image templates according to the spatial vector recorded in association with the three-dimensional image data from among a plurality of kinds of three-dimensional image templates recorded in the template recording unit, said given number being at least two; and
a synthesizing unit implemented by the programmed processor and configured to combine the three-dimensional image data with one three-dimensional image template selected by a user from among the given number of three-dimensional image templates selected by the template selecting unit to produce and output synthesized three-dimensional image data representing a synthesized three-dimensional image,
wherein the spatial vector represents three-dimensional data having X, Y and Z axis contained in the three-dimensional image data, where the X and the Y axis correspond respectively to a horizontal axis and a vertical axis of the planar image data, and the Z axis is an axis perpendicular to a plane formed by the X and the Y axis of the planar image data and indicates a direction in which the subject pops out,
wherein the subject extraction unit further extracts a face of the subject,
wherein a face direction detecting unit which detects the subject's face direction is further provided,
wherein the spatial vector calculating unit uses the face direction to calculate a face spatial vector,
wherein the template selecting unit further selects the three-dimensional image template according to the subject's face direction and the subject's position in the three-dimensional image, and
wherein when the subject faces leftward or rightward and is placed on a center in the three-dimensional image and a character contained in the three-dimensional image template is placed on a left side or on a right side of the subject, the template selecting unit does not select three-dimensional image templates containing the character's up-and-down face directions opposite from the subject's face direction, and selects three-dimensional image templates containing a character directed toward other directions irrespective of the subject's face direction.

12. The image processing device according to claim 11,
wherein the subject extraction unit extracts a plurality of the subject's bodily portions, and
wherein the spatial vector calculating unit calculates spatial vectors of the plurality of the subject's bodily portions.

13. The image processing device according to claim 12,
wherein the three-dimensional image data recording unit records a greatest spatial vector among spatial vectors of the plurality of the subject's bodily portions and the three-dimensional image data in association with each other.

14. The image processing device according to claim 11,
wherein the three-dimensional image data recording unit records the subject's spatial vector in an Exif tag of the three-dimensional image data.

15. The image processing device according to claim 11,
wherein the three-dimensional image data recording unit records the subject's spatial vector in a file other than a file of the three-dimensional image data.

16. The image processing device according to claim 11,
wherein the spatial vector calculating unit calculates a parallax of the subject and the distances from the viewpoints to the subject from the plurality of planar image data having different viewpoints and calculates the spatial vector of the subject from the plurality of planar image data having different viewpoints, the parallax, and the distances.

17. The image processing device according to claim 11,
wherein the template selecting unit selects a three-dimensional image template containing a character whose pop-out amount is greater than N/3 and smaller than 3N, N being the subject's pop-out amount.

18. The image processing device according to claim 11, wherein the template selecting unit sets an order of priority in a character's pop-out amount and face direction contained in the three-dimensional image template and selects the three-dimensional image template according to the order of priority.

19. The image processing device according to claim 11, wherein the template selecting unit displays the pop-out amount and the face direction of a character contained in the three-dimensional image template on a preview screen and selects one three-dimensional image template selected by the user from among a plurality of three-dimensional image templates displayed on the preview screen.

20. A three-dimensional image printing system, comprising:
the image processing device described in claim 11; and
a printing device for printing a synthesized three-dimensional image corresponding to synthesized three-dimensional image data outputted from the image processing device.

21. An image processing device, comprising:
a three-dimensional image data input unit implemented by a programmed processor and configured to enter three-dimensional image data representing a three-dimensional image;
a subject extraction unit implemented by the programmed processor and configured to extract a subject from the three-dimensional image data;
a spatial vector calculating unit implemented by the programmed processor and configured to calculate a spatial vector of the subject from a plurality of planar image data having different viewpoints contained in the three-dimensional image data;
a three-dimensional image data recording unit implemented by the programmed processor and configured to record the spatial vector and the three-dimensional image data in association with each other;
a template recording unit implemented by the programmed processor and configured to record a plurality of kinds of three-dimensional image templates;
a template selecting unit implemented by the programmed processor and configured to select a given number of three-dimensional image templates according to the spatial vector recorded in association with the three-dimensional image data from among a plurality of kinds of three-dimensional image templates recorded in the template recording unit, said given number being at least two; and
a synthesizing unit implemented by the programmed processor and configured to combine the three-dimensional image data with one three-dimensional image template selected by a user from among the given number of three-dimensional image templates selected by the template selecting unit to produce and output synthesized three-dimensional image data representing a synthesized three-dimensional image,
wherein the spatial vector represents three-dimensional data having X, Y and Z axis contained in the three-dimensional image data, where the X and the Y axis correspond respectively to a horizontal axis and a vertical axis of the planar image data, and the Z axis is an axis perpendicular to a plane formed by the X and the Y axis of the planar image data and indicates a direction in which the subject pops out,
wherein the subject extraction unit further extracts a face of the subject,
wherein a face direction detecting unit which detects the subject's face direction is further provided,
wherein the spatial vector calculating unit uses the face direction to calculate a face spatial vector,
wherein the template selecting unit further selects the three-dimensional image template according to the subject's face direction and the subject's position in the three-dimensional image, and wherein when the subject's face direction is directed toward a center, the template selecting unit does not select three-dimensional image templates containing a character's up-and-down face directions opposite from the subject's face direction and selects three-dimensional image templates containing the character's other face directions irrespective of the subject's position and face direction.

22. The image processing device according to claim 21, wherein the subject extraction unit extracts a plurality of the subject's bodily portions, and
wherein the spatial vector calculating unit calculates spatial vectors of the plurality of the subject's bodily portions.

23. The image processing device according to claim 22, wherein the three-dimensional image data recording unit records a greatest spatial vector among spatial vectors of the plurality of the subject's bodily portions and the three-dimensional image data in association with each other.

24. The image processing device according to claim 21, wherein the three-dimensional image data recording unit records the subject's spatial vector in an Exif tag of the three-dimensional image data.

25. The image processing device according to claim 21, wherein the three-dimensional image data recording unit records the subject's spatial vector in a file other than a file of the three-dimensional image data.

26. The image processing device according to claim 21, wherein the spatial vector calculating unit calculates a parallax of the subject and the distances from the viewpoints to the subject from the plurality of planar image data having different viewpoints and calculates the spatial vector of the subject from the plurality of planar image data having different viewpoints, the parallax, and the distances.

27. The image processing device according to claim 21, wherein the template selecting unit selects a three-dimensional image template containing a character whose pop-out amount is greater than N/3 and smaller than 3N, N being the subject's pop-out amount.

28. The image processing device according to claim 21, wherein the template selecting unit sets an order of priority in a character's pop-out amount and face direction contained in the three-dimensional image template and selects the three-dimensional image template according to the order of priority.

29. The image processing device according to claim 21, wherein the template selecting unit displays the pop-out amount and the face direction of a character contained in the three-dimensional image template on a preview screen and selects one three-dimensional image template selected by the user from among a plurality of three-dimensional image templates displayed on the preview screen.

30. A three-dimensional image printing system, comprising:
the image processing device described in claim 21; and
a printing device for printing a synthesized three-dimensional image corresponding to synthesized three-dimensional image data outputted from the image processing device.

* * * * *